(12) United States Patent
Thielemans et al.

(10) Patent No.: US 12,505,785 B2
(45) Date of Patent: *Dec. 23, 2025

(54) SYSTEMS, METHODS, AND DEVICES FOR IMPROVED LIGHT-EMITTING DISPLAY AND INTERPLAY

(71) Applicant: STEREYO BV, Nazareth (BE)

(72) Inventors: Robbie Thielemans, Nazareth (BE); Vince Dundee, Glendale, CA (US)

(73) Assignee: STEREYO BV, Nazareth (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,247

(22) Filed: Mar. 8, 2024

(65) Prior Publication Data

US 2024/0212589 A1 Jun. 27, 2024

Related U.S. Application Data

(63) Continuation of application No. 18/142,951, filed on May 3, 2023, now Pat. No. 11,948,501, which is a (Continued)

(30) Foreign Application Priority Data

Nov. 4, 2019 (BE) .................................. 2019/5759

(51) Int. Cl.
*G09G 3/34* (2006.01)
*G09G 3/32* (2016.01)
(Continued)

(52) U.S. Cl.
CPC ............. *G09G 3/32* (2013.01); *G09G 3/3406* (2013.01); *G09G 3/342* (2013.01); *G09G 5/12* (2013.01);
(Continued)

(58) Field of Classification Search
CPC ............. G09G 2320/0233; G09G 3/32; G09G 2320/0633; G09G 2320/0626;
(Continued)

(56) References Cited

U.S. PATENT DOCUMENTS

| 5,767,818 A | 6/1998 | Nishida |
| 6,055,071 A | 4/2000 | Kuwata et al. |

(Continued)

FOREIGN PATENT DOCUMENTS

| BE | 20195196 | 3/2019 |
| BE | 20195142 | 7/2019 |

(Continued)

OTHER PUBLICATIONS

Belgian Search Report from Belgian Patent Application No. BE202305595, Nov. 21, 2023.

(Continued)

*Primary Examiner* — Dismery Mercedes
(74) *Attorney, Agent, or Firm* — Workman Nydegger

(57) ABSTRACT

Light-emitting or light-reflecting displays with enhanced visual characteristics, include a display based on light-emitting elements such as light-emitting diodes (LEDs). A LED display or screen with improved visual performance is herewith presented for particular use or application in a studio environment where the quality performance of both images, when being captured by a camera or an audience, is challenged. The use and applications of such display, include systems and methods making use of such display, and more particularly concerning the use and application of such displays in studio environments.

20 Claims, 16 Drawing Sheets

Related U.S. Application Data continuation of application No. 16/895,872, filed on Jun. 8, 2020, now Pat. No. 11,881,151.

(60) Provisional application No. 62/858,534, filed on Jun. 7, 2019.

(51) Int. Cl.

| | |
|---|---|
| *G09G 5/12* | (2006.01) |
| *G10K 11/162* | (2006.01) |
| *H04N 5/222* | (2006.01) |
| *H04N 5/765* | (2006.01) |
| *H04N 13/194* | (2018.01) |
| *H04N 13/20* | (2018.01) |
| *H04N 21/242* | (2011.01) |
| *H04N 23/73* | (2023.01) |

(52) U.S. Cl.
CPC ........... *G10K 11/162* (2013.01); *H04N 5/222* (2013.01); *H04N 5/765* (2013.01); *H04N 13/194* (2018.05); *H04N 13/20* (2018.05); *H04N 21/242* (2013.01); *H04N 23/73* (2023.01); *G09G 2310/08* (2013.01); *G09G 2354/00* (2013.01)

(58) Field of Classification Search
CPC ........... G09G 2310/08; G09G 2360/16; G09G 2320/0223; G09G 3/342; G09G 3/3426; G09G 5/12; G09G 3/2092; G09G 3/2018; G09G 2320/0693; G09G 2354/00; G09G 3/3406; G09G 5/003; H04N 23/82; H04N 5/222; H04N 13/20; H04N 5/2228; H04N 5/262; H04N 5/2621; H04N 23/73; H04N 5/40; H04N 23/60; H04N 5/77; H04N 23/90; H04N 5/04; H04N 5/05; H04N 5/08; H04N 5/10; H04N 21/4223; H04N 5/06; H04N 1/00129; H04N 23/62; H04N 23/632; H04N 5/765; H04N 23/56; H04N 21/242; H05B 45/325; H05B 45/46; G06F 3/1446; G06F 3/14; G02B 2027/0138; G02B 2027/014; G02B 27/0172

See application file for complete search history.

(56) References Cited

U.S. PATENT DOCUMENTS

| | | | |
|---|---|---|---|
| 6,483,555 B1 | 11/2002 | Thielemans et al. | |
| 6,717,625 B1 | 4/2004 | Thielemans | |
| 7,015,902 B2 | 3/2006 | Nagai et al. | |
| 7,019,721 B2 | 3/2006 | Thielemans et al. | |
| 7,071,620 B2 | 7/2006 | Devos et al. | |
| 7,071,894 B1 | 7/2006 | Thielemans et al. | |
| 7,079,092 B2 | 7/2006 | Tanghe et al. | |
| 7,102,601 B2 | 9/2006 | Devos et al. | |
| 7,157,838 B2 | 1/2007 | Thielemans et al. | |
| 7,176,861 B2 | 2/2007 | Dedene et al. | |
| 7,205,729 B2 | 4/2007 | Thielemans et al. | |
| 7,227,519 B1 | 6/2007 | Kawase et al. | |
| 7,262,753 B2 | 8/2007 | Tanghe et al. | |
| 7,301,273 B2 | 11/2007 | Dedene et al. | |
| 7,365,720 B2 | 4/2008 | Bouwens et al. | |
| 7,443,466 B2 | 10/2008 | Dedene et al. | |
| 7,777,691 B1 | 8/2010 | Nimmer et al. | |
| D730,309 S | 5/2015 | Hochman et al. | |
| 9,069,519 B1 | 6/2015 | Hall | |
| D751,998 S | 3/2016 | Hochman et al. | |
| 9,380,720 B2 | 6/2016 | Thielemans et al. | |
| 9,477,438 B1 | 10/2016 | Hochman et al. | |
| D771,844 S | 11/2016 | Hochman et al. | |
| 9,524,666 B2 | 12/2016 | Hochman et al. | |
| 9,660,403 B2 | 5/2017 | Hochman et al. | |
| 9,866,828 B1* | 1/2018 | Higdon | H04N 17/002 |
| 9,953,581 B2* | 4/2018 | Lin | G09G 3/2022 |
| 10,325,541 B2 | 6/2019 | Hochman et al. | |
| 10,333,109 B2 | 6/2019 | Hochman et al. | |
| 10,892,297 B2 | 1/2021 | Chae et al. | |
| 10,917,679 B2 | 2/2021 | Dunning et al. | |
| 11,196,940 B2* | 12/2021 | Martin | H04N 23/745 |
| 11,310,436 B2* | 4/2022 | Hochman | H04N 23/73 |
| 11,328,655 B2 | 5/2022 | Sugiyama et al. | |
| 11,445,123 B2 | 9/2022 | Deighton | |
| 11,496,726 B2 | 11/2022 | Deighton | |
| 11,552,061 B2 | 1/2023 | Chae et al. | |
| 11,610,543 B2 | 3/2023 | Thielemans et al. | |
| 11,695,907 B2 | 7/2023 | Steudel et al. | |
| 11,881,151 B2 | 1/2024 | Thielemans et al. | |
| 11,924,560 B2* | 3/2024 | Thielemans | H04N 9/64 |
| 11,948,501 B2 | 4/2024 | Thielemans et al. | |
| 11,948,506 B2 | 4/2024 | Thielemans et al. | |
| 12,080,224 B2* | 9/2024 | Thielemans | G09G 3/32 |
| 12,100,363 B2* | 9/2024 | Thielemans | H04N 13/305 |
| 2002/0163513 A1 | 11/2002 | Tsuji | |
| 2003/0095138 A1 | 5/2003 | Kim et al. | |
| 2003/0128299 A1 | 7/2003 | Coleman et al. | |
| 2003/0133619 A1 | 7/2003 | Wong et al. | |
| 2004/0113875 A1 | 6/2004 | Miller et al. | |
| 2004/0207315 A1 | 10/2004 | Thielemans et al. | |
| 2004/0212582 A1 | 10/2004 | Thielemans et al. | |
| 2004/0233125 A1 | 11/2004 | Tanghe et al. | |
| 2004/0233148 A1 | 11/2004 | Tanghe et al. | |
| 2005/0017922 A1 | 1/2005 | Devos et al. | |
| 2005/0052375 A1 | 3/2005 | Devos et al. | |
| 2005/0116667 A1 | 6/2005 | Mueller et al. | |
| 2005/0122406 A1 | 6/2005 | Voss et al. | |
| 2005/0128751 A1 | 6/2005 | Roberge et al. | |
| 2005/0133761 A1 | 6/2005 | Thielemans | |
| 2005/0134525 A1 | 6/2005 | Tanghe et al. | |
| 2005/0134526 A1 | 6/2005 | Willem et al. | |
| 2005/0213128 A1 | 9/2005 | Imai et al. | |
| 2006/0022914 A1 | 2/2006 | Kimura et al. | |
| 2006/0139238 A1 | 6/2006 | Chiba et al. | |
| 2006/0290614 A1 | 12/2006 | Nathan et al. | |
| 2007/0081357 A1* | 4/2007 | Kim | G02F 1/133603 362/561 |
| 2007/0241988 A1 | 10/2007 | Zerphy et al. | |
| 2007/0253008 A1 | 11/2007 | Edge et al. | |
| 2007/0263394 A1 | 11/2007 | Thielemans et al. | |
| 2008/0046217 A1 | 2/2008 | Polonskiy et al. | |
| 2008/0079816 A1 | 4/2008 | Yen et al. | |
| 2008/0111773 A1 | 5/2008 | Tsuge | |
| 2008/0165081 A1 | 7/2008 | Lawther et al. | |
| 2008/0285981 A1 | 11/2008 | Diab et al. | |
| 2009/0009103 A1 | 1/2009 | McKechnie et al. | |
| 2009/0066631 A1 | 3/2009 | Lianza | |
| 2009/0102957 A1 | 4/2009 | Phelan | |
| 2009/0103200 A1 | 4/2009 | Feklistov et al. | |
| 2009/0295706 A1 | 12/2009 | Feng | |
| 2010/0001648 A1 | 1/2010 | De Clercq et al. | |
| 2010/0103200 A1 | 4/2010 | Langendijk | |
| 2010/0243025 A1 | 9/2010 | Bhatia et al. | |
| 2010/0289783 A1 | 11/2010 | Leppla | |
| 2010/0302284 A1 | 12/2010 | Karaki | |
| 2010/0309218 A1 | 12/2010 | Suen et al. | |
| 2011/0103013 A1 | 5/2011 | Furukawa | |
| 2011/0121761 A1 | 5/2011 | Zhao | |
| 2011/0176029 A1 | 7/2011 | Boydston et al. | |
| 2011/0267501 A1* | 11/2011 | Westhues | H04N 1/113 348/E9.053 |
| 2012/0019633 A1 | 1/2012 | Holley | |
| 2012/0033876 A1* | 2/2012 | Momeyer | G06V 30/142 382/165 |
| 2012/0062622 A1 | 3/2012 | Koyama et al. | |
| 2012/0133837 A1 | 5/2012 | Furukawa | |
| 2012/0287289 A1 | 11/2012 | Steinberg et al. | |
| 2012/0307243 A1 | 12/2012 | Elliott | |
| 2012/0313979 A1 | 12/2012 | Matsuura | |
| 2013/0162696 A1 | 6/2013 | Matsumoto | |
| 2013/0181884 A1 | 7/2013 | Perkins et al. | |
| 2013/0226495 A1 | 8/2013 | Marcu et al. | |

(56) References Cited

U.S. PATENT DOCUMENTS

| | | | |
|---|---|---|---|
| 2013/0249377 A1 | 9/2013 | Hamer et al. | |
| 2013/0272023 A1 | 10/2013 | Lai | |
| 2014/0002718 A1* | 1/2014 | Spielberg | H04N 23/73 348/E5.037 |
| 2014/0009485 A1 | 1/2014 | Asanuma | |
| 2014/0009505 A1 | 1/2014 | Moon et al. | |
| 2014/0049571 A1 | 2/2014 | Erinjippurath et al. | |
| 2014/0049983 A1 | 2/2014 | Nichol et al. | |
| 2014/0125818 A1 | 5/2014 | Friend | |
| 2014/0139740 A1* | 5/2014 | Ohba | H04N 5/06 348/522 |
| 2015/0070402 A1 | 3/2015 | Shah et al. | |
| 2015/0103105 A1* | 4/2015 | Kim | G09G 3/3426 345/102 |
| 2015/0186097 A1 | 7/2015 | Hall | |
| 2015/0229919 A1 | 8/2015 | Weber et al. | |
| 2015/0237343 A1* | 8/2015 | Shiohara | G03B 7/091 348/181 |
| 2015/0339977 A1 | 11/2015 | Nathan et al. | |
| 2015/0348479 A1 | 12/2015 | Kim et al. | |
| 2015/0371405 A1 | 12/2015 | Zhao | |
| 2016/0078802 A1 | 3/2016 | Liang et al. | |
| 2016/0124091 A1 | 5/2016 | Kawahito et al. | |
| 2016/0182790 A1 | 6/2016 | Horesh | |
| 2016/0275835 A1 | 9/2016 | Yuan et al. | |
| 2016/0335958 A1 | 11/2016 | Huang et al. | |
| 2017/0032715 A1 | 2/2017 | Sutherland et al. | |
| 2017/0032742 A1 | 2/2017 | Piper et al. | |
| 2017/0061924 A1 | 3/2017 | Lee et al. | |
| 2017/0069871 A1 | 3/2017 | Yim et al. | |
| 2017/0171492 A1 | 6/2017 | Naito | |
| 2017/0284630 A1 | 10/2017 | Sergenese et al. | |
| 2017/0318178 A1 | 11/2017 | Debevec et al. | |
| 2018/0018793 A1 | 1/2018 | Min et al. | |
| 2018/0060014 A1 | 3/2018 | Son et al. | |
| 2018/0090102 A1 | 3/2018 | Chappalli et al. | |
| 2018/0091860 A1 | 3/2018 | Stokking et al. | |
| 2018/0131160 A1 | 5/2018 | Zhang et al. | |
| 2018/0235052 A1 | 8/2018 | Tada | |
| 2018/0240409 A1 | 8/2018 | Li et al. | |
| 2018/0342224 A1 | 11/2018 | Beon et al. | |
| 2019/0064923 A1 | 2/2019 | Taniguchi | |
| 2019/0080656 A1 | 3/2019 | Herranz et al. | |
| 2019/0098293 A1 | 3/2019 | Lee et al. | |
| 2019/0132560 A1 | 5/2019 | Grosse et al. | |
| 2019/0172404 A1 | 6/2019 | Zhu | |
| 2019/0209858 A1 | 7/2019 | Slaughter et al. | |
| 2019/0212719 A1 | 7/2019 | Ono | |
| 2019/0213951 A1 | 7/2019 | Li et al. | |
| 2019/0244561 A1 | 8/2019 | Zong et al. | |
| 2019/0295457 A1 | 9/2019 | Li et al. | |
| 2019/0306477 A1 | 10/2019 | Nordback | |
| 2019/0356940 A1 | 11/2019 | Mallett | |
| 2019/0364309 A1* | 11/2019 | Von Braun | H04N 21/41415 |
| 2019/0377535 A1 | 12/2019 | Rycyna et al. | |
| 2020/0005699 A1* | 1/2020 | Yi | G06F 3/1446 |
| 2020/0014904 A1 | 1/2020 | Wetzstein et al. | |
| 2020/0027386 A1 | 1/2020 | Wang et al. | |
| 2020/0037011 A1 | 1/2020 | Zong et al. | |
| 2020/0043201 A1 | 2/2020 | Tanaka et al. | |
| 2020/0098333 A1 | 3/2020 | Marcu | |
| 2020/0103705 A1* | 4/2020 | Chen | H05B 45/32 |
| 2020/0126501 A1 | 4/2020 | Yamazaki et al. | |
| 2020/0160791 A1 | 5/2020 | Chung | |
| 2020/0225903 A1 | 7/2020 | Cohen | |
| 2020/0280761 A1 | 9/2020 | Staples | |
| 2020/0286424 A1 | 9/2020 | Thielemans et al. | |
| 2020/0388210 A1 | 12/2020 | Thielemans et al. | |
| 2020/0403117 A1 | 12/2020 | Fabien et al. | |
| 2021/0005161 A1 | 1/2021 | Lee | |
| 2021/0014385 A1 | 1/2021 | Boggavarapu et al. | |
| 2021/0056937 A1 | 2/2021 | Sakai | |
| 2021/0124174 A1 | 4/2021 | Tokunaga et al. | |
| 2021/0125545 A1 | 4/2021 | Sohn et al. | |
| 2021/0125570 A1 | 4/2021 | Kang et al. | |
| 2021/0185778 A1 | 6/2021 | Otten | |
| 2021/0201769 A1 | 7/2021 | Morris et al. | |
| 2021/0217157 A1 | 7/2021 | Han et al. | |
| 2021/0225267 A1 | 7/2021 | Thielemans et al. | |
| 2021/0227270 A1 | 7/2021 | Braun | |
| 2021/0266624 A1 | 8/2021 | Zong et al. | |
| 2021/0295766 A1 | 9/2021 | Sugiyama et al. | |
| 2021/0297717 A1 | 9/2021 | Braun | |
| 2021/0306394 A1 | 9/2021 | Zong et al. | |
| 2021/0321032 A1 | 10/2021 | Braun | |
| 2021/0345058 A1 | 11/2021 | Itakura et al. | |
| 2021/0366411 A1 | 11/2021 | Yang et al. | |
| 2021/0383842 A1 | 12/2021 | Han et al. | |
| 2021/0397398 A1 | 12/2021 | Han et al. | |
| 2022/0014728 A1 | 1/2022 | Deighton | |
| 2022/0020727 A1 | 1/2022 | Noh et al. | |
| 2022/0059045 A1 | 2/2022 | Kobayashi et al. | |
| 2022/0059607 A1 | 2/2022 | Murugan et al. | |
| 2022/0060612 A1* | 2/2022 | Hochman | H04N 5/06 |
| 2022/0076615 A1 | 3/2022 | Ding et al. | |
| 2022/0103738 A1 | 3/2022 | Deighton | |
| 2022/0150456 A1 | 5/2022 | Steudel et al. | |
| 2022/0191109 A1 | 6/2022 | Chen et al. | |
| 2022/0246670 A1 | 8/2022 | Chen et al. | |
| 2022/0254317 A1 | 8/2022 | Hochman et al. | |
| 2022/0350562 A1 | 11/2022 | Wang et al. | |
| 2022/0375387 A1 | 11/2022 | Deighton | |
| 2022/0375403 A1 | 11/2022 | Cheng et al. | |
| 2022/0413790 A1 | 12/2022 | Cai et al. | |
| 2023/0013582 A1 | 1/2023 | Wang et al. | |
| 2023/0154399 A1 | 5/2023 | Thielemans et al. | |
| 2023/0162400 A1 | 5/2023 | Liu et al. | |
| 2023/0162662 A1 | 5/2023 | Zhang et al. | |
| 2023/0163142 A1 | 5/2023 | Lu et al. | |
| 2023/0186821 A1 | 6/2023 | Hashempour et al. | |
| 2023/0209207 A1 | 6/2023 | Hochman et al. | |
| 2023/0274693 A1 | 8/2023 | Thielemans et al. | |
| 2023/0282153 A1 | 9/2023 | Thielemans et al. | |
| 2023/0298503 A1 | 9/2023 | Zhang et al. | |
| 2023/0326175 A1 | 10/2023 | Zhang et al. | |
| 2024/0022686 A1 | 1/2024 | Thielemans et al. | |
| 2024/0044465 A1 | 2/2024 | Thielemans et al. | |

FOREIGN PATENT DOCUMENTS

| | | |
|---|---|---|
| BE | 1026226 A1 | 11/2019 |
| CN | 102290003 A | 12/2011 |
| CN | 206741357 U | 12/2017 |
| CN | 207352560 U | 5/2018 |
| CN | 110602875 A | 12/2019 |
| CN | 110617000 A | 12/2019 |
| DE | 102006054856 A1 | 1/2009 |
| EP | 1172783 A1 | 1/2002 |
| EP | 1780798 A | 5/2007 |
| EP | 2323072 A1 | 5/2011 |
| EP | 3099058 A1 | 11/2016 |
| EP | 3139422 A2 | 3/2017 |
| GB | 2469819 A | 11/2010 |
| JP | 2007062892 A | 3/2007 |
| JP | 2019214445 A | 12/2019 |
| KR | 20170065163 A | 6/2017 |
| TW | 200608327 A | 3/2006 |
| TW | 200608328 A | 3/2006 |
| WO | 2013186278 A1 | 12/2013 |
| WO | 2015114720 A1 | 8/2015 |
| WO | 2018164105 A1 | 9/2018 |
| WO | 2019215219 A1 | 11/2019 |
| WO | 2020253249 A1 | 12/2020 |
| WO | 2021009719 A1 | 1/2021 |
| WO | 2022013191 A1 | 1/2022 |
| WO | 2022064062 A1 | 3/2022 |
| WO | 2022087322 A1 | 4/2022 |

OTHER PUBLICATIONS

Response to Belgian Search Report from Belgian Patent Application No. BE2023/5595, filed Mar. 21, 2024.

(56) References Cited

OTHER PUBLICATIONS

Extended European Search Report from European Patent Application No. EP23185674.1, Nov. 16, 2023.
Partial European Search Report from European Patent Application No. EP23198096, Nov. 29, 2023.
Extended European Search Report from European Patent Application No. EP23198096.2, Apr. 9, 2024.
Extended European Search Report from European Patent Application No. EP23190432.7, Feb. 12, 2024.
Extended European Search Report from European Patent Application No. EP23160521, Jul. 6, 2023.
Response to Extended European Search Report from European Patent Application No. EP23160521, dated Jan. 29, 2024.
Extended European Search Report from European Patent Application No. EP23218322.8, Mar. 27, 2024.
Extended European Search Report from European Patent Application No. EP23218336.8, Apr. 10, 2024.
Partial European Search Report from European Patent Application No. EP23218348.3, Apr. 30, 2024.
Extended European Search Report from European Patent Application No. EP23218353.3, Mar. 26, 2024.
Extended European Search Report from European Patent Application No. EP23218356.6, Apr. 5, 2024.
Extended European Search Report from European Patent Application No. EP23218377.2, Apr. 24, 2024.
Search Report for BE 2019/05759 mailed Jan. 23, 2020, 18 pages.
"The Ins and Outs of HDR—Gamma Curves" available at "https://www.eizoglobal.com/library/management/ins-and-outs-of-hdr/index2.html" at least as early as Jun. 8, 2020, 3 pages.
Baker, Simon, "Pulse Width Modulation (PWM)", Mar. 17, 2015, 13 pages, TFT Central.
Burr, David, "Motion Perception: Human Psychophysics", Apr. 18, 2013, pp. 763-776, MIT Press.
Cast, Inc., "Understanding—and Reducing—Latency in Video Compression Systems", Oct. 25, 2013, 7 pages, retrieved from <https://web.archive.org/web/20131025202911/https://www.design-reuse.com/articles/33005/understanding-latency-in-video-compression-systems.html>.
Davis et al., "Humans perceive flicker artifacts at 500 Hz", Feb. 3, 2015, 4 pages, Nature, Scientific Reports.
Kang et al., "Nanoimprinted Semitransparent Metal Electrodes and Their Application in Organic Light-Emitting Diodes," May 21, 2007, 6 pages, Advanced Materials.
Larson, Jennifer, "How Many Frames Per Second Can the Human Eye See?", Oct. 20, 2020, 12 pages, retrieved from <https://www.healthline.com/health/human-eye-fps>.
Lee et al., "Solution-Processed Metal Nanowire Mesh Transparent Electrodes", Jan. 12, 2008, pp. 689-692, Nano Letters, vol. 8, No. 2.
Mackin et al., "High Frame Rates and the Visibility of Motion Artifacts", Jun. 30, 2017, 19 pages, SMPTE Motion Imaging Journal, vol. 126, Issue 5.
Thielemans, Robbie, "Displays Applications of LEDs", Handbook of Visual Display Technology, May 21, 2011, 14 pages.
Thielemans, Robbie, "LED Display Applications and Design Considerations", Handbook of Visual Display Technology, May 21, 2011, 5 pages, retrieved from https://link.springer.com/referenceworkentry/10.1007/978-3-540-79567-4_76.
Tobii Connect, "The speed of human visual perception", Sep. 14, 2022, 1 page, retrieved from <https://connect.tobii.com/s/article/the-speed-of-human-perception?language=en_US>.
Wikipedia, "MAC Address", 10 pages, retrieved from <https://en.wikipedia.org/wiki/MAC_address>.
Wilson, Derek, "Exploring Input Lag Inside Out", Jul. 16, 2019, 2 pages, retrieved from <https://www.anandtech.com/show/2803>.
Zhang, Yin, "Performance Characteristics of Lithium Coin Cells for Use in Wireless Sensing Systems", Jun. 17, 2012, 143 pages, All Theses and Dissertations, Brigham Young University.
"The Ins and Outs of HDR—Gamma Curves", Jun. 8, 2020, 3 pages, retrieved from <https://www.eizoglobal.com/library/management/ins-and-outs-of-hdr/index2.html>.
Extended European Search Report from corresponding EP Application No. EP18198749.6, Nov. 12, 2018.
International Search Report and Written Opinion from PCT Application No. PCT/EP2019/061804, Jun. 13, 2019.
Applicant's Amendment/Remarks filed at the EPO on Feb. 20, 2020 for PCT/EP2019/061804.
Applicant's Amendment/Remarks filed at the EPO on May 26, 2020 for PCT/EP2019/061804.
International Preliminary Report on Patentability from PCT/EP2019/061804, Jul. 10, 2020.
Belgian Search Report from BE Application No. 201905196, Aug. 13, 2019.
Belgian Search Report for Belgian Patent Application No. BE2019/5970, Jul. 24, 2020.
Response to Belgian Search Report for Belgian Patent Application No. BE2019/5970, filed by Applicant at the Belgian Patent Office on Nov. 24, 2020.
Belgian Search Report from corresponding Belgian Application No. BE 202205007, Jun. 7, 2022.
Extended European Search Report from corresponding EP Application No. 22185014.2, Dec. 8, 2022.
Office Action from European Application No. 19722133.6, Jan. 19, 2023.

* cited by examiner

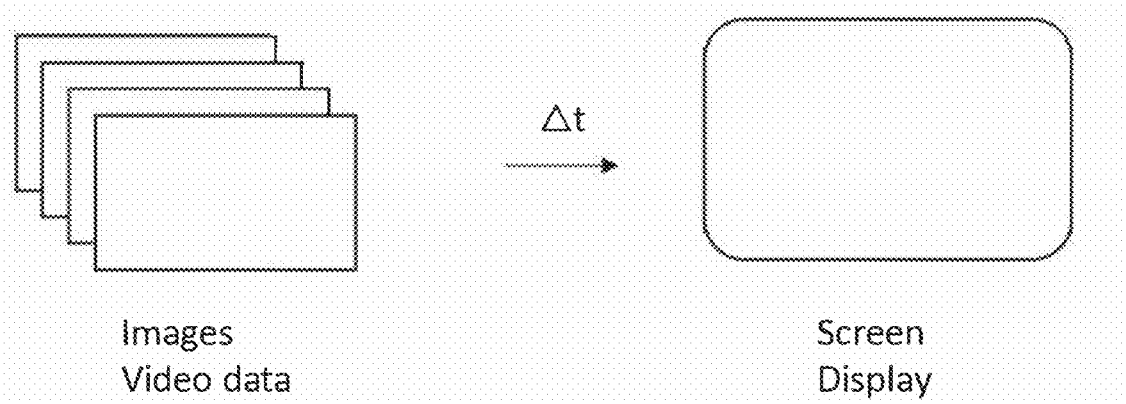
Images
Video data
Screen
Display
Figure 1 - (prior-art)
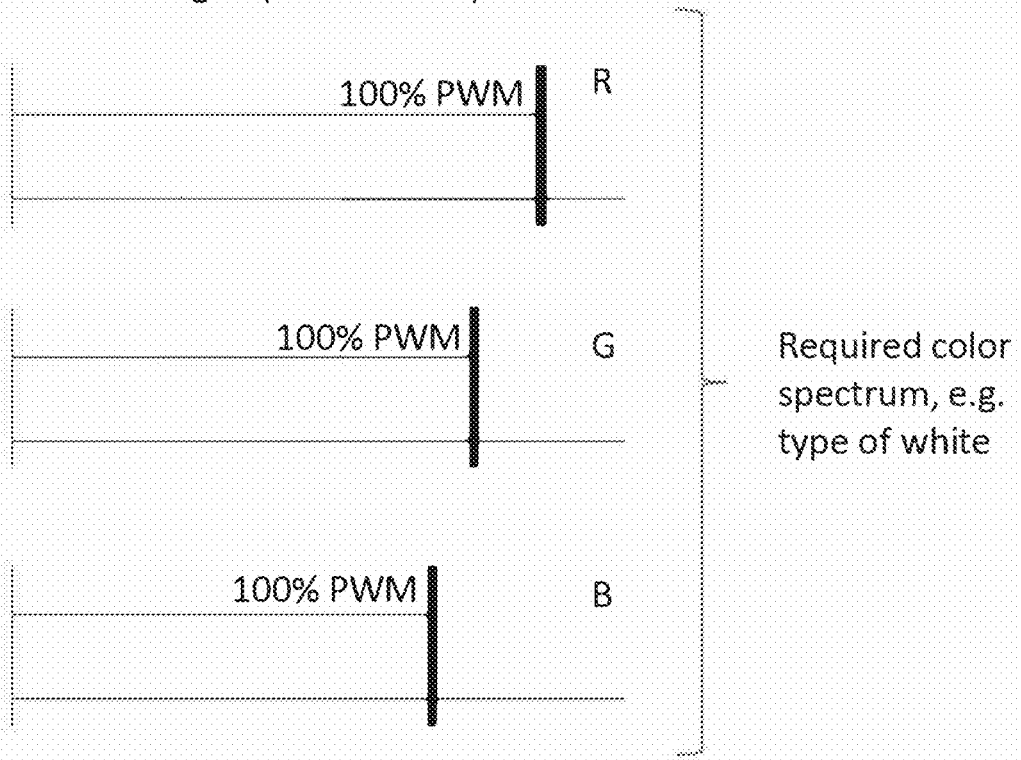
Figure 3

In stead of absorbing => open

Examples of acoustic surfaces
These surfaces can be in between the LEDs
Or also over the LEDs (when made transparent)
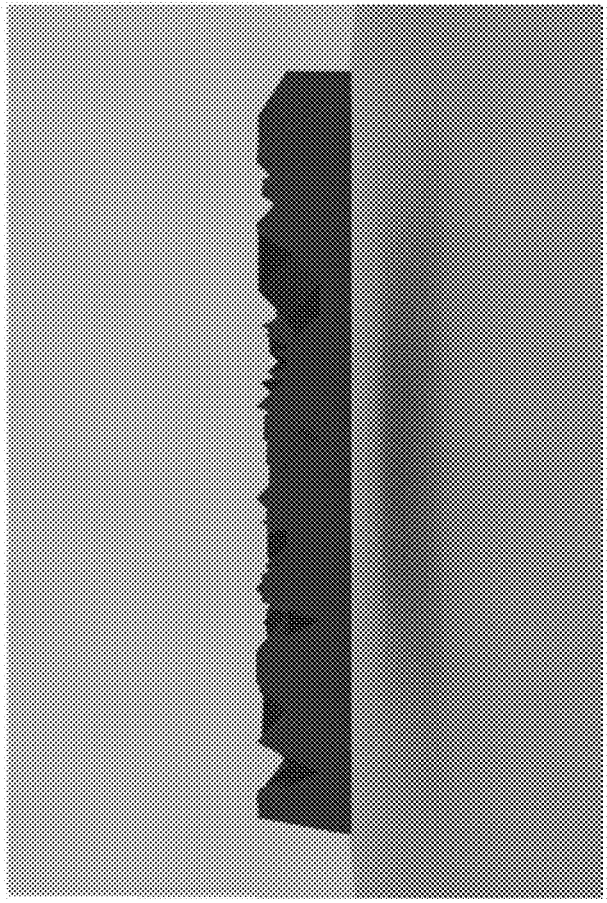
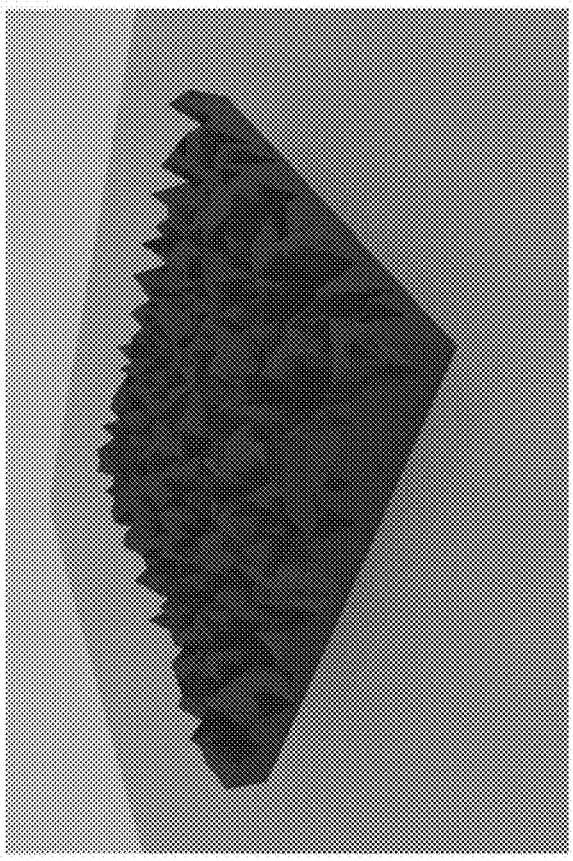
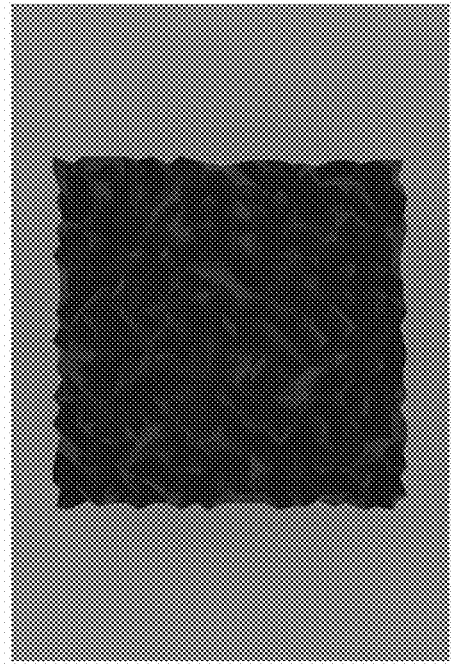
Figure 8

LED board

Acoustic absorbing structures can be here or here (transparent) or both

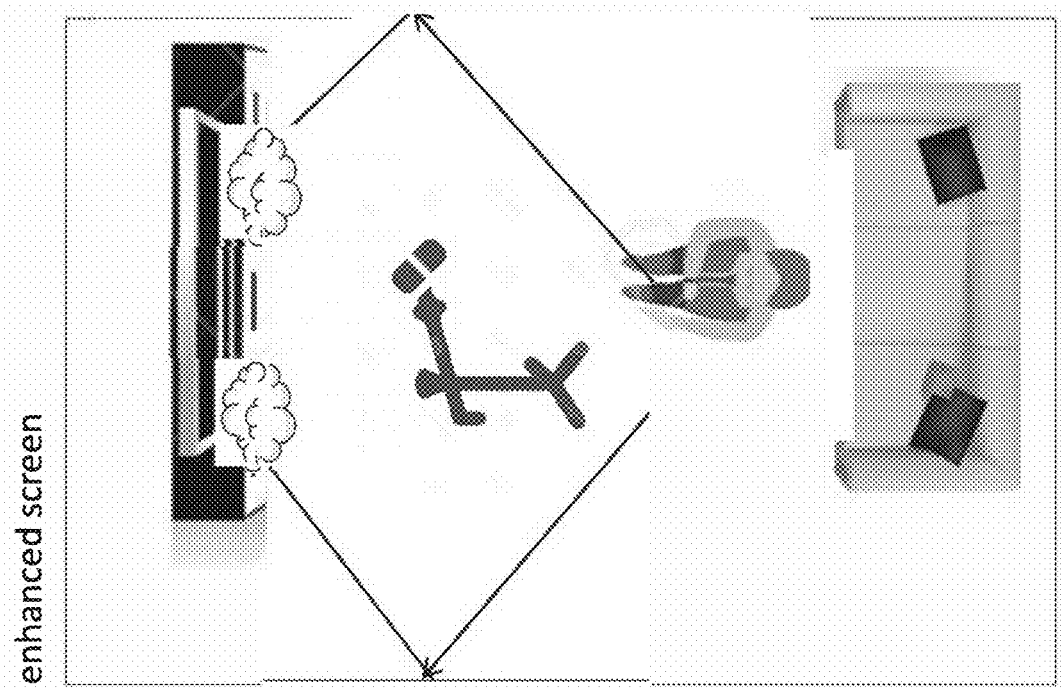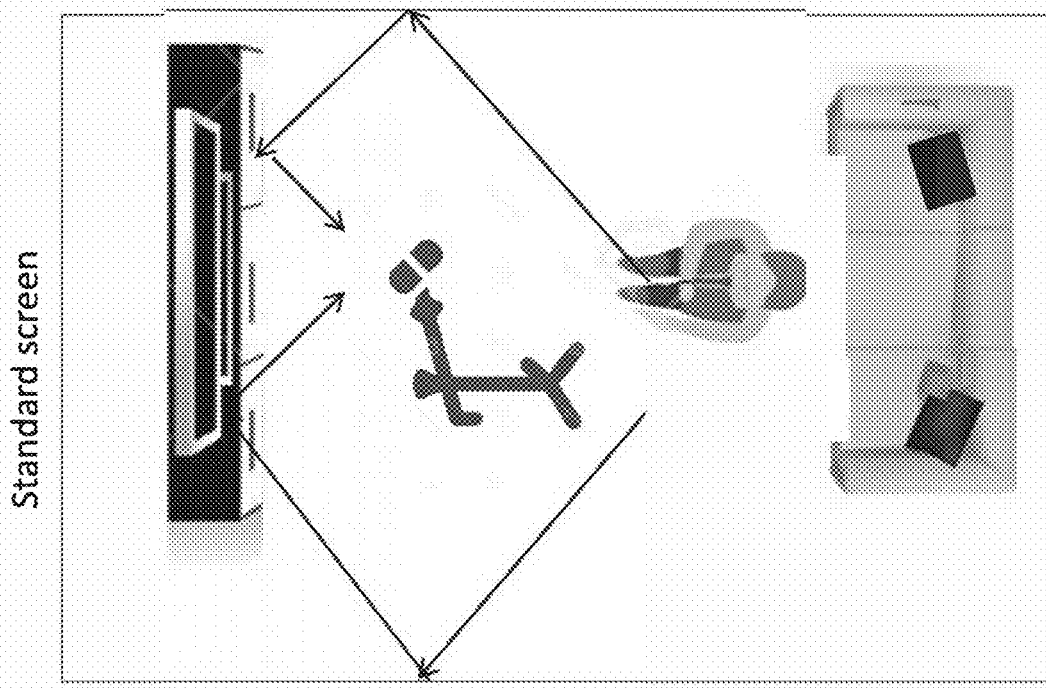
Figure 10

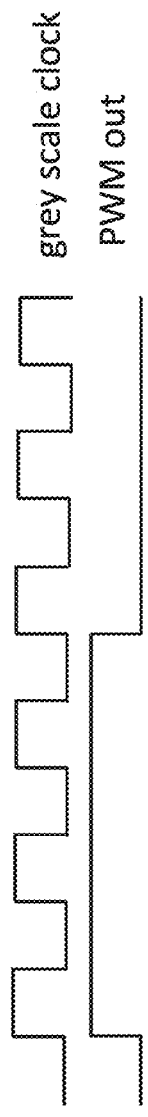
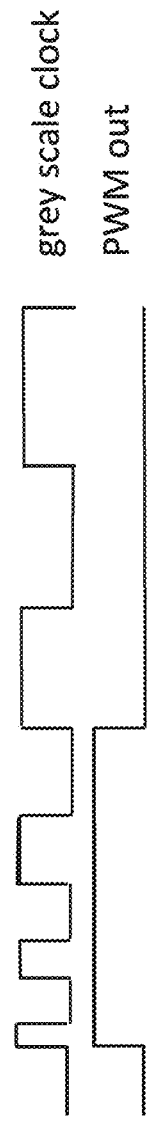
Figure 18

SYSTEMS, METHODS, AND DEVICES FOR IMPROVED LIGHT-EMITTING DISPLAY AND INTERPLAY

TECHNICAL FIELD

The invention relates to a display with enhanced visual and/or acoustic characteristics, more in particular the invention relates to the light source display being based on light-emitting elements such as for example light-emitting diodes (LEDs). A LED display or screen with enhanced acoustic characteristics is herewith presented. The invention also relates to the use and applications of such LED display, including systems and methods making use of such LED display.

BACKGROUND OF THE INVENTION

Existing displays, both using light emitting (e.g. LED or OLED) or reflective technologies (e.g. LCD) that are used for studio applications, meaning within for example a broadcasting environment, in general show defects on the final screen that is seen by the public or user. Complex and cumbersome manipulation is then often performed to make images acceptable again for the viewer. Only a mere acceptability is provided by lack of better availability. A robust and simple solution is not provided in the art.

Moreover, in a recording studio, next to the use of displays such as LED displays, audio from all kind of sources from any possible location needs to be taken into account. Cameras are used for recording in the studio. In addition to the images from the displays, the structural and furniture environment of the studio, the actors or people present therein, as well as the audio being produced, are captured by the cameras and/or microphones for recording, and in case of a recording event open for the public, these are also captured by the audience. Hence, a high-quality representation of both visual and acoustic performance is quite a challenge in this respect. In other words, there is a need for a studio display with enhanced acoustic characteristics and adapted high-quality visual features for the particular purpose of studio applications.

AIM OF THE INVENTION

The aim of the invention is to cover display devices, such as for example light-emitting display devices, which are optimized for studio/on screen/camera applications, i.e. for example a studio having a LED screen (e.g. in the back, behind actors or presenters or stage) and using a camera for recording scenes. The light-emitting display devices are e.g. based on LED technology, but not limited thereto, and hence also including other possible comparable light-emitting sources as known in the art. Further on, this invention can also be used for displays based upon reflective light technologies (e.g. LCD displays without backlight), bi-stable reflective displays or interferometric based reflective displays. Both picture performance adaptations as well as acoustic performance enhancement are considered to aim for a good quality recording on camera of a studio event.

SUMMARY OF THE INVENTION

The invention relates to methods (and related circuits and set-up's) for improving a display's visual and/or acoustic performance in relation to a camera recording the image displayed by the display, wherein the display comprises a plurality of distinct light sources more in particular one of said distinct sources being Light Emitting Diode (LED), and/or in relation to audio recording wherein the display needs special precautions for reducing environmental noise and undesired reflections. Instead of a display based on distinct light sources, another type of display based on reflective light areas (such as LCD for instance) can also be used. It is noted that within this text mainly a light-emitting display, and a LED display in particular will be referred to, although it is herewith understood that the invention regarding visual and acoustic performance enhancement of a display, also applies for displays based on reflective technologies.

The invention especially relates to displays wherein the light sources are driven by (bit size limited) (PWM) drivers with a set fixed current.

One or more of the proposed methods in accordance with the invention, analyse the output of the display required for displaying a (reference) image sequence and derive setting (like a set fixed current) therefrom and control said light source(s) accordingly.

The invention also relates to optimized exploiting the (full or wider than standard) dynamic range of a light source display by properly setting said fixed current.

The invention relates to improving a light source display's visual performance, wherein one adapts the light source input signal to the bit size limited PWM drivers, to compensate for various effects such as nonlinearities caused by setting the current as indicated above and/or nonlinearities, caused by the (RLC) behaviour of the board whereon said light sources are mounted and/or due to temperature effects.

One or more of the proposed methods relate to achieve the ideal human eye transfer function, preferably by using control features (like the clock) of said PWM drivers. By using this control feature, the bit size limit reduces drastically.

The invention relates to displays in a studio environment, meaning arrangements of one or more displays, one or more cameras at least in part recording what is displayed on one or more of these displays, and more in particular such arrangements also include typically sound infrastructure like sound generating and/or sound capturing instruments (like microphones).

In relation to such studio environments and sound including arrangements, it is worth emphasizing that the display may be (and typically is) also an (unwanted) sound generating instrument, particularly the display subsystems like coolers and/or power supply thereof. Moreover, the display can also reflect sound that it has captured from the environment. Especially in a closed environment and when using a curved display, audio signals can be strongly reflected back into the studio, herewith disturbing the actors, the audience and/or the sound being captured by a microphone.

It is an aspect of the invention to provide measures to improve (besides the visual performance also) the sound performance in such studio environment by providing related adaptations to said displays, for example by means of removing or turning off components within the display making a lot of noise or sound, but also for example by means of providing sound absorbing material, or decreasing the display's sound reflecting characteristics by means of adapting the display or LED screen towards a more open structure.

In a further embodiment thereof, also the driving of the display is adapted to minimize bad sound performance of the studio.

As an exemplary embodiment thereof, as indicated elsewhere in the description, the visual performance is influenced (heavily) by temperature effects on the light sources (LEDs) of the display. While in ordinary displays one will combat this by providing sufficient cooling facilities, in the invention instead, realizing the negative effect on sound performance, temperature compensation in the control of the display is included, thereby leaving room for lower cooling demand (and hence lower unwanted sound generation).

In a further embodiment thereof, it is realized that the power supply behaviour and/or display driver behaviour and/or display behaviour itself in relation to heat production depends also heavily on the way the display is driven or controlled. As an exemplary embodiment thereof, as indicated elsewhere in the description, the control is based on analysing a reference sequence to thereby find a tuned (just enough) control approach, which influences positively the settings (like current setting) of the driver circuitry (and the related power supply) and also the light throughput of the display itself, in relation to heat production, thereby also lowering cooling demands, with the effects on sound as indicated already above.

In a first aspect of the invention, a method is provided wherein one or more displays (e.g. LED displays) are part of a studio environment, further comprising one or more cameras at least in part recording what is displayed on one or more of these displays. The studio environment may further include sound infrastructure. According to an embodiment, the displays are adapted to minimize their sound generating behaviour, and/or are adapted to maintain good visual performance irrespective to an improved sound generating behaviour. According to an embodiment, the displays are adapted to optimize sound behaviour of the studio, in particular either said displays are provided with acoustic absorbing material and/or adapted to let part of the sounds through in order to avoid acoustic reflections.

In a second aspect of the invention, a method is provided for improving the interplay of a light source display with a camera recording the image displayed by the light source display, the method comprising: (i) receive the light source input signal; and (ii) apply the light source input signal to said light source, after a programmable delay (relative to a synchronisation signal related to said camera). According to an embodiment the type of light source used for the display is a Light Emitting Diode (LED) and/or said programmable delay is selected to improve said interplay of said light source display with said camera, more in particular to reduce banding effects when recording on camera. The cause of the banding effect is due to different timing when the camera shutter opens compared to the discrete PWM generation for the light sources.

In a third aspect of the invention, a method is provided for optimized exploiting the (wider than standard) dynamic range of a light source display comprising a plurality of distinct light sources with bit size limited drivers, the method comprising: for at least one light source of said display, (i) determining the dynamic range required for displaying a (reference) image sequence; (ii) set a reference or off-set value (e.g. current) of the driver of said corresponding light source in the middle of said required dynamic range; (iii) (equally) discretize the required dynamic range around said set reference or off-set value based on the (available) bit size of said driver; and (iv) control said light source accordingly. With the term 'wider than standard' is meant that when using a bit size limited driver, the aim is to try to use more bits than is or would be the case for standard in the art displays. According to an embodiment, the type of light source used for the display is a Light Emitting Diode (LED), and/or the light sources are driven by PWM drivers with a set fixed current, being said set reference or off-set value.

According to an aspect of the invention, a method is provided for improving a light source display visual performance for a light source display, comprising a plurality of distinct light sources, mounted on a (PCB) board, the method comprising: for at least one light source, (i) receive the light source input signal; (ii)) adapt the light source input signal, to compensate for nonlinearities, caused by the nonlinear behaviour between the change of said reference or off-set value and the light output of said light source perceived by the human eye (preferably after camera recording the image displayed by the light source display); (iii) apply the adapted light source input signal to said light source.

According to an aspect of the invention, a method is provided for optimized exploiting the (wider than standard) dynamic range (towards an optimized maximum) of a light source display comprising a plurality of distinct light sources with bit size limited drivers, the method comprising: for the plurality of light sources of said display connected to the same driver, (i) for each of them, determining the dynamic range required for displaying a (reference) image sequence; (ii) set a reference or off-set value of the driver of said corresponding light source in the middle of the maximum of said required dynamic ranges; (iii) for each of them discretize the required dynamic range around said (common) set reference or off-set value based on the (available) bit size of said driver; and (iv) control said light sources accordingly. The term optimized maximum is further explained. The higher the light output in high-dynamic range images, the more bit depth there is needed to retain sufficient detail in the low lights. Aiming for an optimized maximum in dynamic range means for example that for as high as possible light output, as most as possible bit depth is aimed at, and this being more than would be the case for standard state-of-the-art LED screens. The light source used for instance can be a Light Emitting Diode (LED), and/or the light sources are possibly driven by PWM drivers with a set fixed current, being said reference or off-set value.

According to further aspect of the invention, a method is provided for controlling a light source display comprising a plurality of distinct light sources, wherein the light sources are driven by PWM drivers with a set fixed current, wherein the human eye transfer function (relating light output of the light source to the light perceived by the human eye, preferably after camera recording or both taking into account after camera recording and direct perception) adaptation, being realized (at least in part) by modulating the clock of said PWM drivers, in particular use of high frequency for low light and low frequency for high light outputs. The method may further include compensation for (RLC) nonlinearities of the (PCB) board, and/or nonlinearities caused by change of reference or off-set value of said drivers.

According to further aspect of the invention, a method is provided for optimized exploiting the (wider than standard) dynamic range of a light source display comprising a plurality of distinct light sources with bit size limited drivers, the method comprising: for each light pixel, for each colour therein and related light source of said display, (i) determining the dynamic range required for displaying a (reference) image sequence; (ii) set a reference or off-set value of the driver of said corresponding light source in the middle of said required dynamic range; (iii) (equally) discretize the required dynamic range around said set reference or off-set value based on the (available) bit size of said driver; and (iv) control said light source accordingly.

In an aspect of the invention, a method is provided for improving a light source display visual performance for a light source display, comprising a plurality of distinct light sources, mounted on a (PCB) board, the method comprising: for at least one light source, (i) receive the light source input signal; (ii)) adapt the light source input signal, to compensate for nonlinearities, caused by the (RLC) behaviour of said board; and (iii) apply the adapted light source input signal to said light source. The light source can be a Light Emitting Diode (LED). According to an embodiment, said visual performance is the visual performance perceived by a human eye before or after camera recording the image displayed by the light source display.

According to an embodiment, said adaptation being part of or based on the human eye transfer function (relating light output of the light source to the light perceived by the human eye) preferably after camera recording or both taking into account after camera recording and direct perception.

According to an embodiment, for one or more (particular a few, typically low light wherein nonlinearities cause most detrimental visual performance effects such as for example not displaying desired colour or not all light sources lighting up equally when it is desired) light output points (in said human eye transfer function) a correction factor is determined, and for all other points a non-continuous interpolation (e.g. by use of a spline function) is performed. The method can be used on a per light source basis or alternatively for a set of light sources located nearly on said (PCB) board in a region.

According to an aspect of the invention, a method is provided for determining adaptation information (correction factors) suited for use in one of the methods as above, the method comprising: (a) displaying an image or sequence of images (video) with said light source display; (b) determine the visual performance perceived by a human eye (and/or after camera recording the image displayed by the light source display); (c) compare this visual performance with the ideal visual performance; (d) compute said adaptation information (correction factors) based on said comparison. The method can be applied to high density resolution displays (0.625 mm pixel pitch and up). The method can also be applied to displays wherein the light sources are driven by PWM drivers with a set fixed current.

In a further aspect of the invention, a method is provided for improving a light source display visual performance for a light source display, comprising a plurality of distinct light sources, wherein said visual performance is the visual performance perceived by a human eye both before or after camera recording the image displayed by the light source display, the method comprising: providing a light source display with at least 4 different colours (which may be a partly overlapping spectrum); and for at least one light source, (i) receive the light source input signal; (ii) adapt the light source input signal, to compensate for camera conversion effects; (iv) further adapt the light source input to compensate for the visual performance perceived by a human eye directly after said camera conversion effect compensation and (iv) apply the adapted light source input signal to said light source. According to an embodiment, the light source being a Light Emitting Diode (LED), and/or said colours consisting of RED, GREEN, BLUE and CYAN and/or ORANGE, and/or said colours consisting of RED, GREEN, BLUE and WHITE.

In a further aspect of the invention, a method is provided for improving a light source display visual performance for a light source display the method comprising: for each light pixel (a pixel having at least 2 colours), for each colour therein (i) determining the maximum required light output required for displaying a (reference) image sequence; (ii) set a reference or off-set value of the driver of said corresponding light source accordingly (same maximum); and (iii) control said light source accordingly. According to an embodiment, said light source being a Light Emitting Diode (LED). The method can be applied to displays wherein the light sources are driven by PWM drivers with a set fixed current, being said reference or off-set value. According to an embodiment, said determining the maximum required light output required takes into account the camera recording of the image displayed by said display.

In a further aspect of the invention, a method is provided for improving a light source display visual performance for a light source display, comprising a plurality of distinct light sources, mounted on a (PCB) board, the method comprising: for at least one light source, (i) receive the light source input signal; (ii) adapt the light source input signal, to compensate for temperature effects; and (iii) apply the adapted light source input signal to said light source. According to an embodiment, said temperature effect is determined by monitoring the on time of said light source and estimating said temperature effect therefrom. The light source display may further comprise temperature sensors; and said temperature sensor can be used for calibrating said estimation. Moreover, said temperature sensor can be used also for said adaptation, by e.g. using a behavioural temperature model of the light source display. Means for monitoring on-time (e.g. digital counters) can also be provided and can improve above accuracy of temperature compensation by e.g. also using on-time of neighbouring light sources.

According to an aspect of the invention, a method is provided for determining the relation between the on time of a light source, mounted on a (PCB) board and the temperature effect therefrom.

According to another aspect of the invention, a method is provided for determining the relation between the temperature as measured by a temperature sensor mounted on a board and the temperature at a light source at a certain distant at said board.

In an aspect of the invention, one of the methods above are provided for displays being part of a studio environment, with one or more displays, one or more cameras at least in part recording what is displayed on one or more of these displays. According to an embodiment, said studio environment further includes sound infrastructure, and/or said displays are adapted to minimize their sound generating behaviour. According to an embodiment, said displays are adapted to maintain good visual performance irrespective to the improved sound generating behaviour.

BRIEF DESCRIPTION OF THE DRAWINGS

FIG. 1 schematically illustrates prior-art solution in compensating for the frame delay of the video display system, by means of having the background played out a few frames earlier compared to the front action.

FIG. 3 shows an embodiment for illustrating the aspect of current setting for the individual colours (instead of PWM tuning) for achieving required colour spectrum, in accordance with the invention.

FIG. 8 shows examples of acoustic surfaces in accordance with the invention.

FIG. 10 shows an example of a standard screen and its sound reflections in comparison with an acoustic enhanced screen, in accordance with the invention.

FIG. 18 shows an embodiment for illustrating the aspect of grey scale clock in relation to PWM, in accordance with the invention.

DETAILED DESCRIPTION OF THE INVENTION

Figure 2:
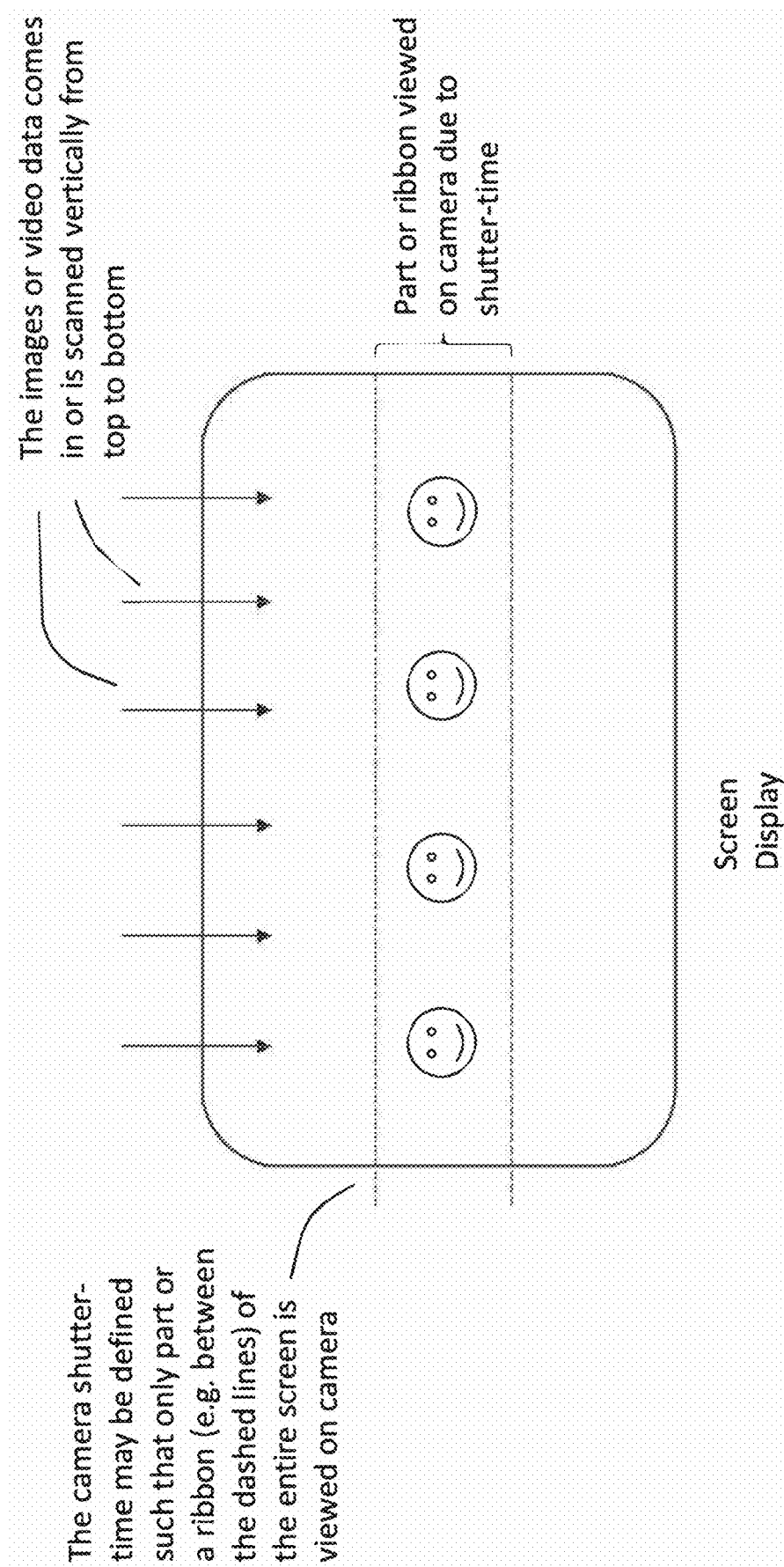
FIG. 2 shows an embodiment for illustrating the aspect of vertical sync update in relation to camera shutter-time, in accordance with the invention.

The aim of this invention is to cover LED (but not limited to that technology) display devices which are optimized for studio/on screen/camera applications (i.e. studio having a (LED-)screen (e.g. in the back, behind actors or presenters or stage) and using a camera for recording scenes) whereby the picture performance needs to be changed or adapted in order also to have acceptable performance on camera and to have acoustic performance so that when put in cube (or cubical) and/or dome or circularly shaped screen (i.e. other shapes than standard cubes are also referred to) that act as a background for e.g. actors that also have acceptable acoustic performance so that the sound doesn't bounce off from the screen directly and also acceptable real-time recording of actor conversations is achieved. This is just an example of usage, but—as one can easily deduct—has also advances in e.g. home theatres or cinemas where this display system is used. As mentioned, LED display devices are given by means of example, and are mostly referred to in this description, although the invention is not limited thereto. Hence, display devices or displays in general based on either light-emitting as well as light-reflecting technology are considered with the invention.

In other words, a display such as a LED display is proposed, being adapted to studio applications, such that better conditions either acoustically or regarding audio, or either visually are perceived by the actors and/or players in the studio, as well as by the recording or production crew for a studio application. Hence, an improved performance in the making of pictures, movies, television shows or other kind of broadcasting, including also real-time application, in video as in audio aspects is achieved.

The technical implementation for the above described aim or proposal, is now described into detail. A list of technical parameters that need adaptation compared to traditional displays with regard to camera recording in an environment with (background) screen, is now given.

1. Frame Rate Latency

In case of action on the 'background' and in relation to foreground action or triggers, it is needed that the background action (on screen of the display) is totally synchronized with the audio and actor performance in front of the screen. Traditionally this was compensated for by having the background play out a few frames earlier compared to the front action, to compensate for the frame delay of the video display system as schematically illustrated in FIG. 1. However, a solution that avoids this is to reduce frame delay in the source towards on screen display as much as possible. Dependent on the display and data distribution design, this can be limited to 1.5 frames or even less. This however means that the video digital pipeline and processing needs to be changed accordingly to accommodate for less frame delay, i.e. for example using more parallel processing (implying that a stronger processor is needed), less buffering and avoiding timing congestion constraints are taken into account such that that images or video data won't appear onto the screen display in multiple bits and pieces, but presents smoothly. It is noted that, in case of not live or not real-time applications (but recorded, and viewed later) the audio is sometimes co-delayed because of synchronization issues otherwise. This is of course only possible in case of recordings, that are edited or viewed later and not real-time.

2. Vertical Sync Update

Linked to the above feature, what is deemed very useful is that the display can show the video (refresh the video) related to vertical sync update, but that the update time is programmable compared to the fixed position of the sync signal. This means that whenever sync comes, the display waits certain amount of programmed 'clock' before updating the screen. This feature is very useful for determining and finding optimal exposure timings on the camera to make sure the 'grabbing' and or A/D conversion (transfer signal or content to digital value) in the camera takes place when the PWM driven screen is started, and hence light emitting elements of the display (or e.g. LEDs of the LED display) will light up.

On one hand, the camera has a particular so-called shutter-time (comparable with diaphragm on a lens). On the other hand, the images or video data is scanned vertically onto the screen or display, meaning that the images appear in vertical sequence. The camera shutter-time may be defined such that only part or a ribbon (e.g. between the dashed lines) of the entire screen is viewed on camera. In case this part or ribbon coincides with not yet received new images entering from top to bottom of the screen, then nothing shall be seen within this part or ribbon. According to an embodiment of the invention as shown in FIG. 2, there are always provided new images or video data within the ribbon, representing the shutter-time of the camera. In other words, a synchronization is provided by means of having a programmable update time of new entering images or the sync signal with which new images are scanned. The programable aspect implies that it can be programmed such that certain amount of time is waited until images are viewed or represented.

Going a step further, this can be done not only per screen, but also e.g. on tile by tile basis, or even segment by segment in case segments in tiles would be needed.

3. Reduce or Eliminate Banding Effects Caused by Multiplexing

Traditional displays are optimized for cost of light emitting sources or elements and electronics to drive them. By means of example, consider for instance a LED display (as traditional display) being optimized for cost of LEDs and electronics to drive them. Hence, there is a tendency (to reduce silicon cost) to increase multiplexing ratio. Herewith is also referred to Belgian patent application BE2019/5196 filed with priority date 7 Mar. 2019 regarding "Real-time deformable and transparent display" wherein multiplexing issues are described into detail, and in particular wherein is described to reduce, avoid or eliminate multiplexing by means of using a local LED driver. Since the human eye does 'slow' integration, one has the impression that all the multiplexed LEDs are on all the time although they are time multiplexed on/off . . . . This principle in combination with the camera shutter-time creates the typical banding effects seen on camera. Hence, in order to reduce this effect to a minimal is to reduce multiplexing as much as possible and even have no multiplexing at all . . . . This doesn't necessarily mean that cost is higher because when multiplexing is reduced, the efficiency becomes higher and even cheaper LEDs can be used as the average LED on time will be equivalently longer. Going even further on this route enables us to e.g. make use of LEDs with integrated drivers, for which again is referred to the Belgian patent application BE2019/5196 as mentioned above. The latter aspect of integrated drivers totally avoids multiplexing and hence limits, avoids or excludes banding effects.

It is noted that we can also use the LEDs used for the deformable display as described in BE2019/5196, in order not to have all these issues on camera but for sake of this invention description we can also link immediately to this formerly filed Belgian patent application.

4. Set Current for Individual Colours Instead of Tuning PWM for Required Light Output Another item that is typically overlooked in the light emitting elements (e.g. LEDs) or display industry is the current (I) settings to the individual light emitting elements (e.g. LEDs). In traditional setups, these currents are fixed and light output is modulated with PWM. But since for studio applications, the typical needed light output is lower than average usage (because of e.g. background aspect of the screen in studio), if one reduces the brightness, that means that the PWM cycle is reduced and when the PWM cycle is reduced, this means the actual 'on' time of the light emitting element or e.g. LED is less and this then means that the chance of the camera shutter-time not noticing the 'on' time of the light emitting element or e.g. LED is higher. Hence, the grey scale reproduction on camera is not deemed ok. Therefor it is advised to set the currents adequate (instead of tuning PWM) for each individual colour, as shown in FIG. 3. In other words, the current is adapted for maximum PWM per colour for achieving the required light output. As a result, there is no longer loss of bits being related to colour depth, and hence no loss of colour depth is perceived.

Moreover, the idea is to have the current of the light emitting elements or e.g. LEDs being programmable (see also PQ curve profiling at the end of the document regarding dynamic range) to the desired maximal light output at the desired colour temperature (for colour temperature see later in paragraph 9. as there can be also camera profiling involved . . . referral to the principle of metamerism).

5. RLC Behaviour and Non-Linear Effects

Figure 4:
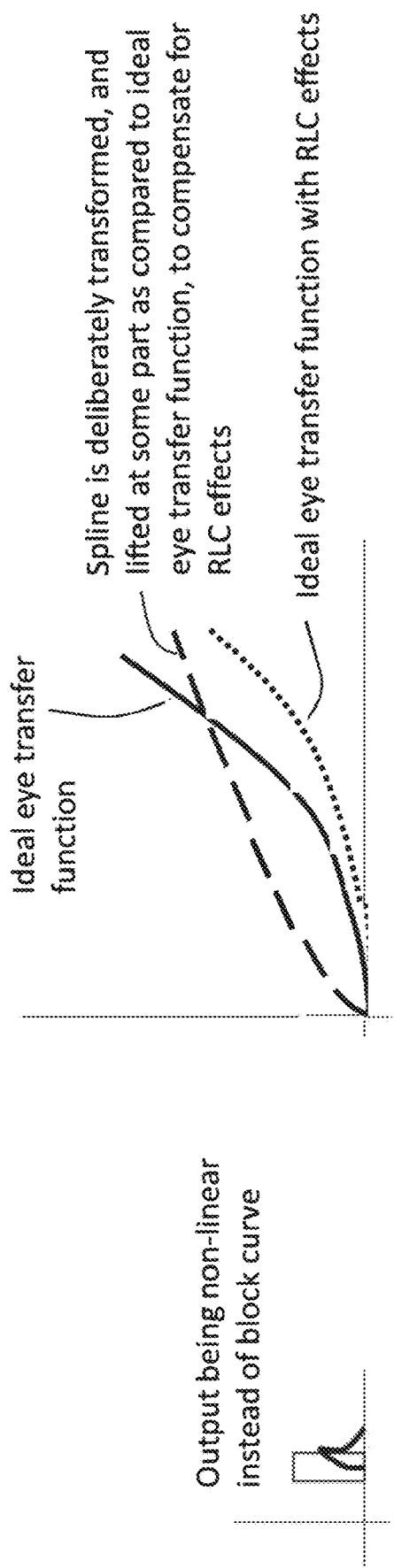
FIG. 4 illustrates RLC behaviour and non-linear effects, and shows an embodiment for illustrating how to compensate for non-linear effects or so-called non-linearities using spline functions or more general non-discontinuous interpolation, in accordance with the invention.
Figure 5:
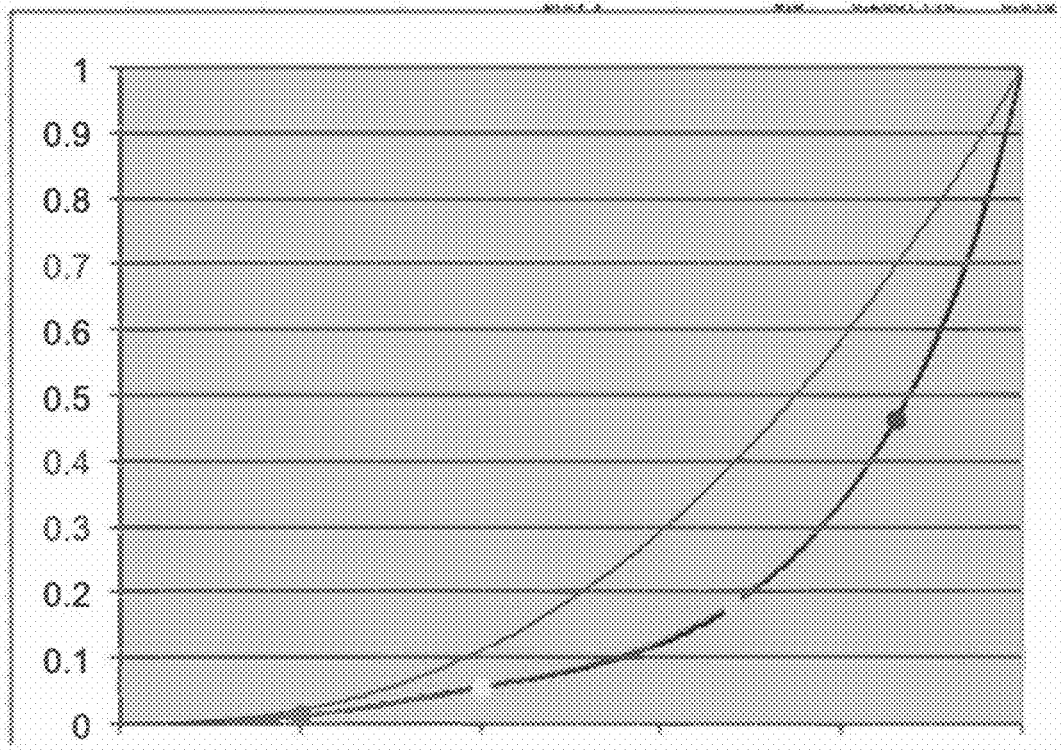
FIG. 5 graphically illustrates gamma correction with a spline function, in accordance with the invention.

The importance of previous current setting is now further motivated because of the RLC behaviour of PCB board (electronics). Constant current drivers with PWM function typically are deemed linear. This is in general the case. However, in the lowlights (i.e. the region where not a lot of light is needed, very small grey scale detail) this is not the case. The main reason for this is due to routing layout on PCB board and hence the traces and routing lines have a typical RLC behaviour. For high resolution displays (<3 mm or higher resolution, linked with multiplexing lines routed on the PCB, especially the RC has a negative (or destroying) effect on the grey scale linearity. In some other cases even, this can cause crosstalk (cfr. typical LED ghosting effects). Avoiding this issue has been described in many papers or documents and is out of the scope of this invention description. But nevertheless that is known in the art how to avoid, the prior-art doesn't solve non-linearities. Since also the response of the human eye is not linear to light or brightness perception, typical gamma functions need to be applied. However, traditional systems don't take these non-linearities into account. While referring to FIG. 4, to compensate for these non-linearities e.g. spline functions can be used to alter the lowlight drive so that for human eye, the desired light output is achieved. In other words, spline functions or more general non-discontinuous interpolation is used to compensate for non-linear effects or so-called non-linearities. See also graphical representation of FIG. 5 illustrating gamma correction with e.g. spline function.

It can go even further that the function or characteristic is even different for every light emitting element (e.g. LED) and/or region on the display board (e.g. LED display board). Hence, a gamma function per pixel or region is implemented to adjust and correct for even better or more uniform video performance.

6. Temperature Compensation

Typically, also, (O)LED/LCD boards need to have uniform temperature. As it is known in the industry, (O)LEDs are temperature sensitive (especially and typically red dies). A combination of temperature sensors in the (O)LED tile, together with active measurement of 'on' time of the (O)LED (e.g. digital counters), one can estimate the red die brightness behaviour. A circuitry to measure and compensate individually is added so that red brightness of the individual (O)LEDs or regions of (O)LEDs is compensated for and colour or colour temperature is maintained. Here, the compensation is preferable on PWM and not adapting current, whereas per individual (O)LED this compensation tuning PWM is more convenient due to cost efficient (O)LED display architecture (although in theory compensating by means of adapting current would also be feasible).

7. Acoustics

For typical studio applications, not only the video or colour performance is of utmost importance, but also the acoustic behaviour of the display.

Figure 6B:
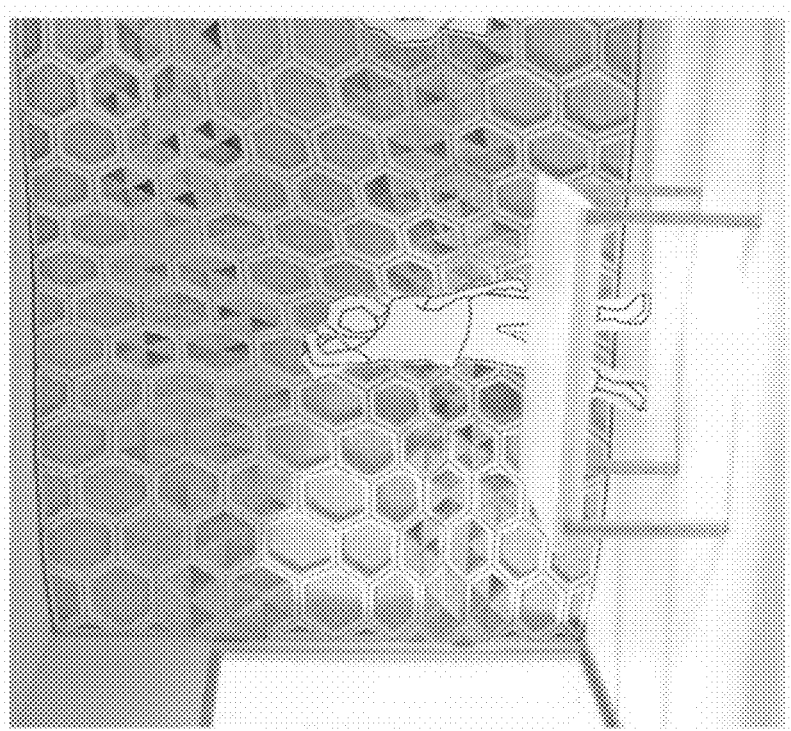
FIGS. 6A and 6B show examples of an open screen.
Figure 6A:
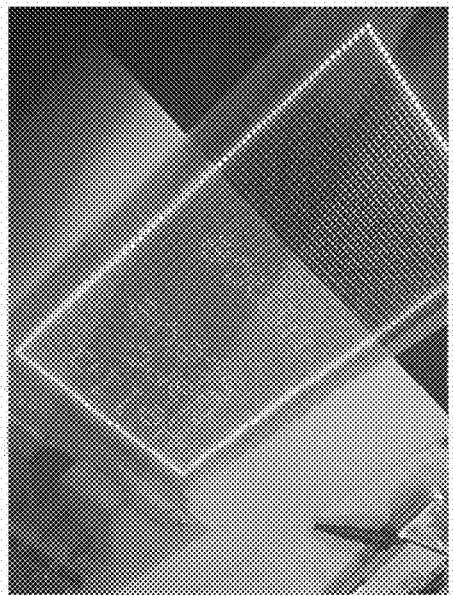

Regarding acoustics we have in such (studio) application 2 items to solve:

a/ Acoustic noise of the screen itself. This can be either due the use of fans or even psu (power supply) noise (typical coil vibrations.) The latter has to be solved by means of better design to reduce this noise (frequency, potting, phasing of current draw). The first one can be reduced by making the fan speed dependent on cooling required and even turn off when threshold is deemed ok for safe operation. Also, the thermal design of the display or e.g. LED tile can help a lot. It is noted that internal convection in closed cabinet and fan will normally result into less audible noise compared to an open design.

b/ Studio noise due to the geometry of state-of-the-art displays in studio applications. This is the most important for studio applications: since the typical screens are flat or plane, being curved they form a very sizeable surface that reflects sound or noise, which is not deemed to be a good characteristic (e.g. screen behind camera shoot where actors have a conversation reflects the conversation such that the echo and noise makes the conversation inaudible for the actors themselves). Multiple solutions are proposed:

Open screen (being characterized by a certain degree of (acoustical) transparency, and for which referral can be made to the open structure of the deformable display as described in patent application BE2019/5196) of which example is shown in FIG. 6 (*a*)

Open screen with (sound absorbing) cloth behind of which example is shown in FIG. 6 (*b*)

Screen with optical enhancer on top

Figure 7:
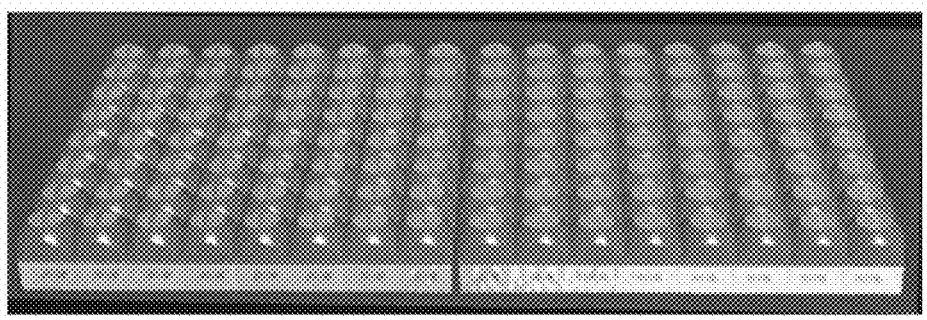
FIG. 7 shows an example of acoustic absorbing material provided in between light-emitting elements.
Figure 9:
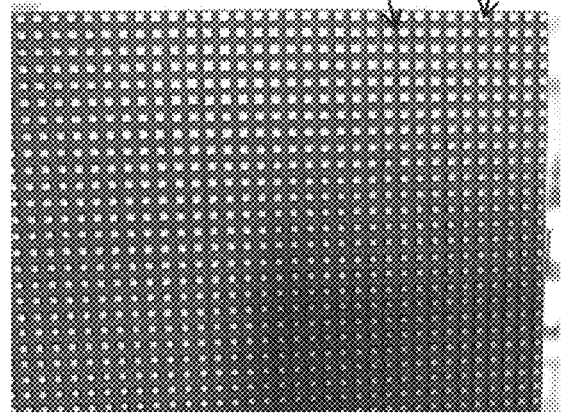
FIG. 9 shows an example of acoustic absorbing structures provided in between LEDs of a LED board, in accordance with the invention.

Acoustic absorbing and/or diffusing material in between light emitting elements or e.g. LEDs Acoustic absorbing and/or diffusing surface in between light emitting elements or e.g. LEDs Acoustic absorbing and/or diffusing surface (e.g. made black) in between light emitting elements or e.g. LEDs and transparent on top of the light emitting elements or e.g. LEDs For the acoustic absorbing material and/or surfaces (in between the light emitting elements or e.g. LEDs) is referred to the illustrations of FIGS. 7 to 9. The optical enhancer as referred to above, may also have the function e.g. to change the beam angle of the light sources (e.g. LEDs) or to add diffuseness and increase e.g. perception of fill factor. Moreover, the optical enhancer may at the same time be an acoustic enhancer under the condition that the structure or architecture is conform the acoustic wavelength. FIG. 10 shows an example of a standard screen and its sound reflections in comparison with an acoustic enhanced screen, in accordance with the invention.

Figure 11:
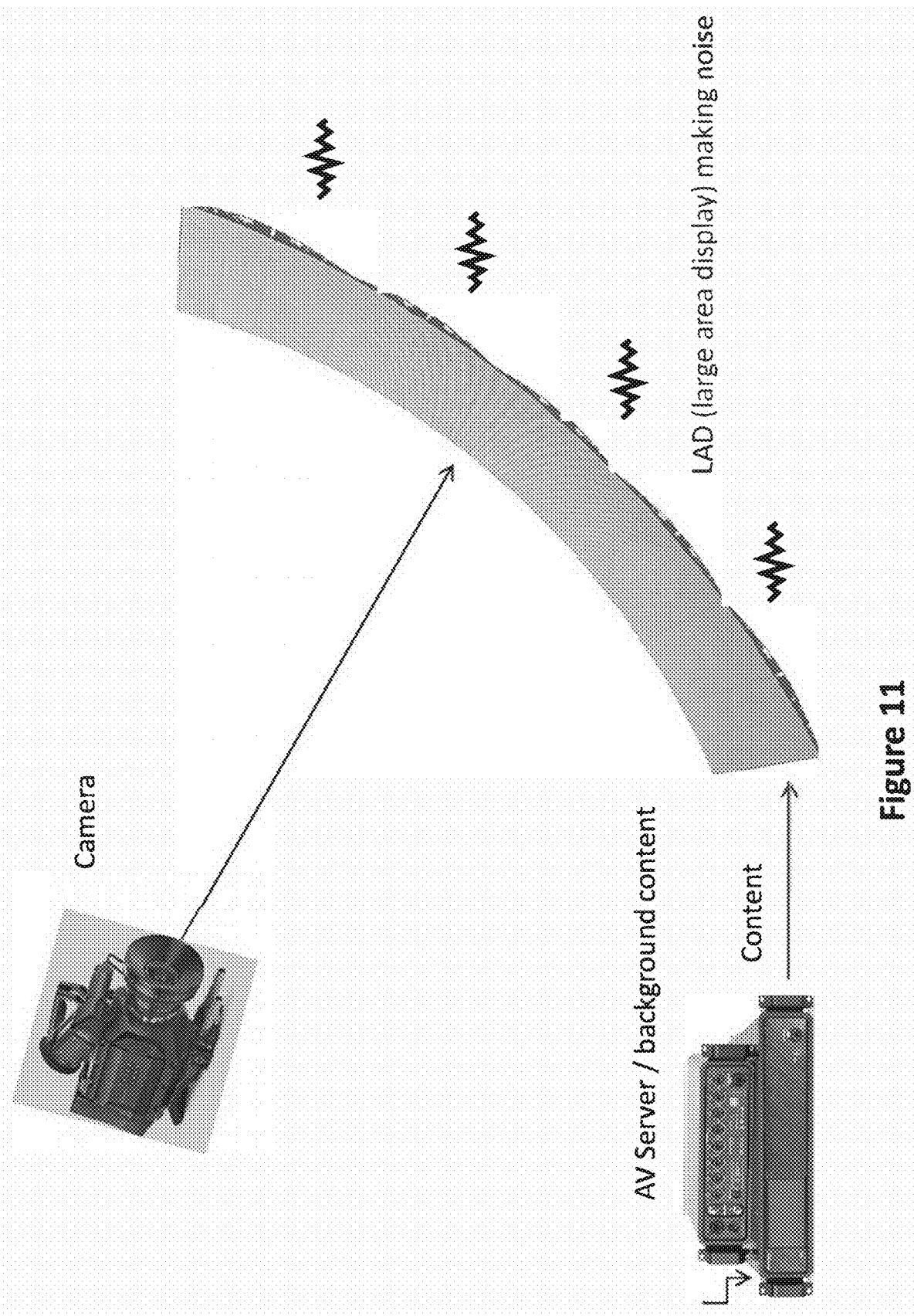
FIG. 11 shows an embodiment of a studio setting, wherein a camera is surveying a display wall making noise, in accordance with the invention.
Figure 12:
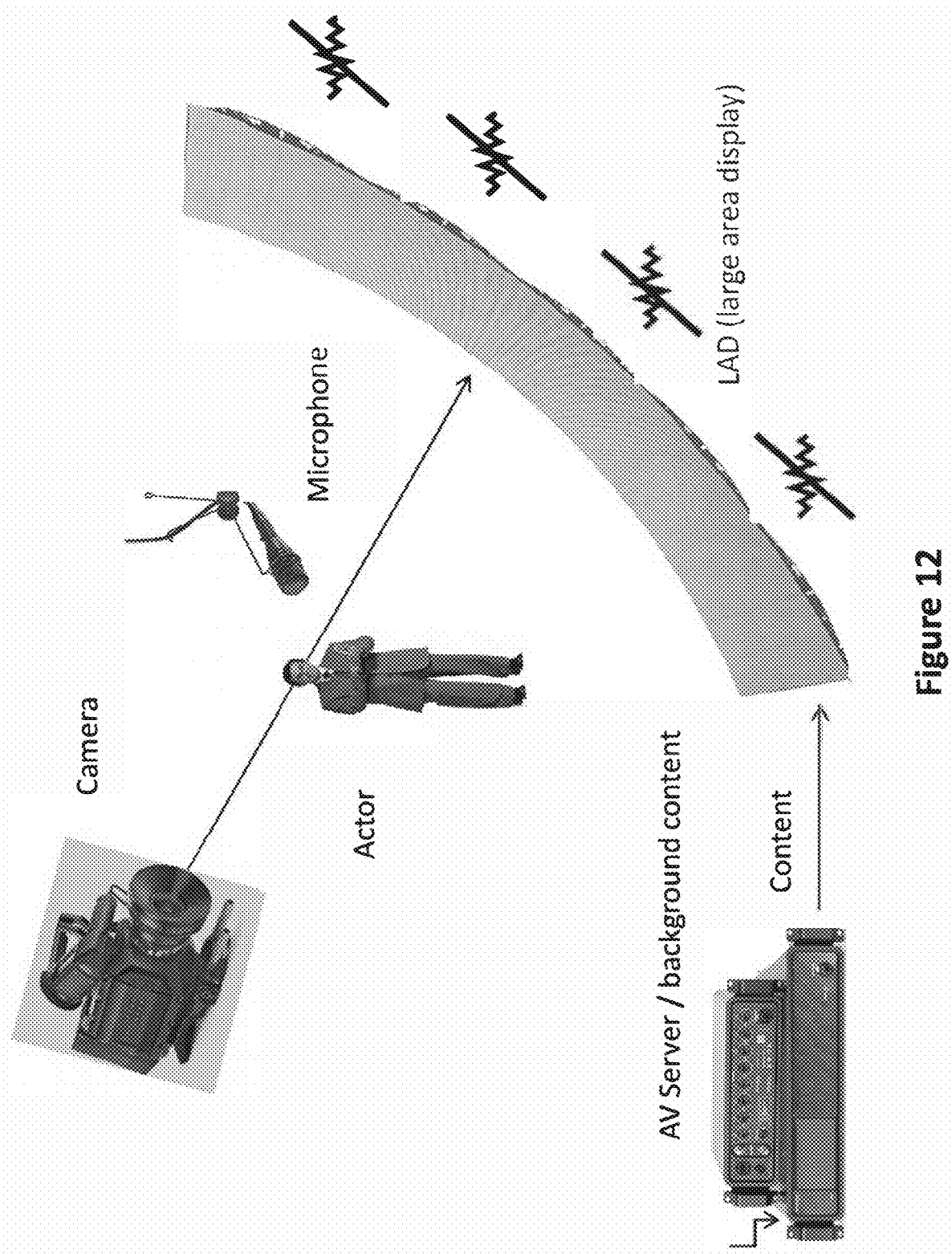
FIG. 12 shows an embodiment of a studio setting, wherein a camera is surveying an actor and a display wall of which the noise is suppressed or reduced by means of for example fan regulation or light output adaptation, in accordance with the invention.
Figure 13:
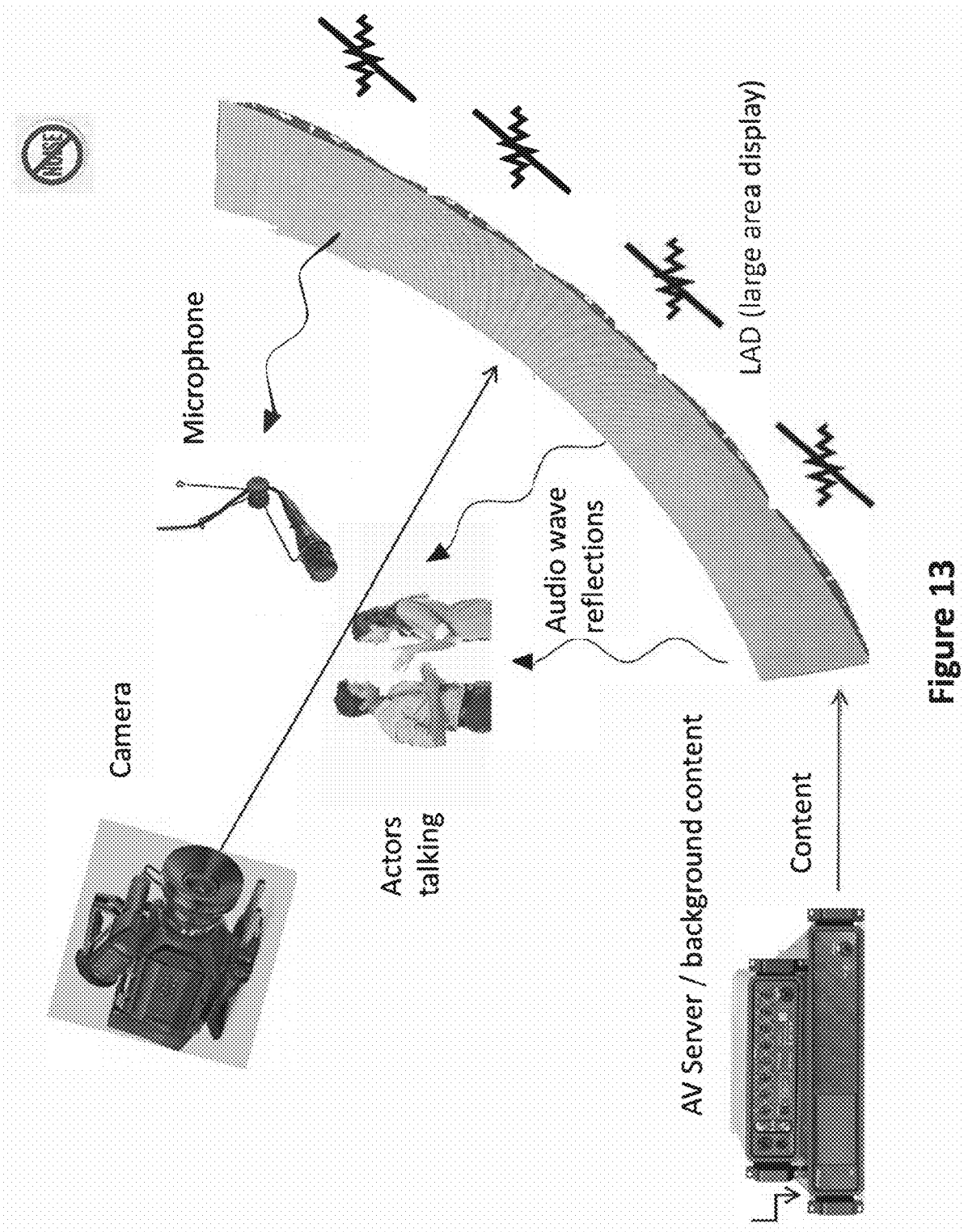
FIG. 13 shows an embodiment of a studio setting, wherein a camera is surveying actors talking and a display wall of which the noise is suppressed or reduced as FIG. 12, and wherein the display wall is provided with acoustic absorbing or diffusing material, or the display wall having an open structure, such that audio wave reflections from the surface of the display wall are suppressed or reduced, in accordance with the invention.

A few embodiments, in accordance with the invention, of a studio setting with enhanced visual and/or acoustic performance are described with FIGS. 11-13. FIG. 11 shows an embodiment of a studio setting, wherein a camera is surveying a display wall making noise, in accordance with the invention. The display wall or e.g. LED-wall has to perform well to achieve good captured images with the camera. Adaptation of settings in the display wall are made such that a correct representation of images is achieved after having been captured by the camera.

FIG. 12 shows an embodiment of a studio setting, wherein a camera is surveying an actor and a display wall of which the noise is suppressed or reduced by means of for example fan regulation or light output adaptation, in accordance with the invention. The noise or sound being emitted by the display wall is typically fan noise, of the fan present there within for cooling purposes. By means of either excluding or removing the fan, or else regulating or modulating it with the generated heat, the noise can be reduced or suppressed. The fan is for example forced for operating or turning slower and hence making less noise, when the temperature has become lower. Alternatively, when reducing the light output of the display wall, less power is involved and thus less heat will be generated by the display wall. As a result, the fans present can automatically be slowed down or maybe even turned in some occasions.

FIG. 13 shows an embodiment of a studio setting, wherein a camera is surveying actors talking and a display wall of which the noise is suppressed or reduced as FIG. 12, and wherein the display wall is provided with acoustic absorbing or diffusing material, or the display wall having an open structure, such that audio wave reflections from the surface of the display wall are suppressed or reduced, in accordance with the invention. The display wall, more in particular for instance its wall surface facing the studio environment and/or the actors, can also reflect sound or audio waves. Particularly when the display wall is curved, the effect on e.g. the actors will be even stronger. As a solution for eliminating such audio reflections from the display wall, an open structure or architecture for the display can be opted. Another possible solution is providing for example an acoustic absorbing and/or diffusing material in (e.g. between the LEDs) or onto (e.g. as a surface layer) the display wall.

8. Add markers as well. Referral can be made here to markers as described in the Belgian patent application BE2019/5196. Screen markers can be either embedded in the acoustic absorbing and/or diffusing material or can be generated by the light emitting elements or e.g. LEDs. These markers can be used for e.g. geometric reference settings of the image recorded by the camera. Alternatively, the markers can also be used as a reference to map and geometrically alter the display content so that it matches the desired on-screen positioning. Further on, such markers might also be used for interactive scene playing whereby they can be used for cameras embedded in head up displays to create immersive environments.

9. Colour conversion at the display (e.g. LED display) and hence colour conversion in camera is no longer necessary.

Figure 14:
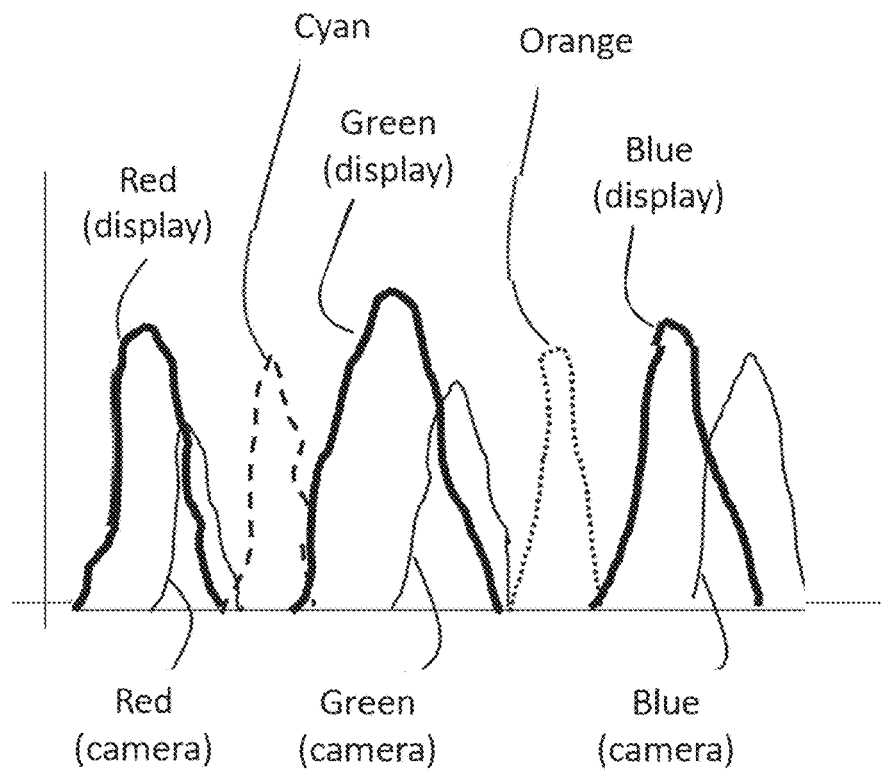
FIG. 14 schematically illustrates the light emitted colour spectrum for Red, Green, Blue of the display and of the camera respectively, including additional colours to be added (e.g. cyan, orange) to the display, such that the human eye visual perception of all colours is correct.

As illustrated in FIG. 14, the light emitted colour spectrum for Red, Green, Blue of the display is not necessarily the same as the camera colour sensitivity curves, although part of the spectra can be overlapping. Hence, the camera will perceive the colours differently compared those exposed by the display.

A traditional solution for this flawed colour capture by the camera is that operators tune the RGB (or other) colour gains in the camera setting itself. But this has a detrimental effect, because the perceived colours seen though the camera will look acceptable when recording the display, but the colour representation (as seen through the camera) from the background, person(s), actor(s), performer(s) or presenter will also change. Hence, using this traditional adjustment always requires a 'good' enough approach meaning that this (manual) adjustment will always result in 'OK enough' or just perceived adequate on camera for both the display as well as the environment. In other words, it will never be perfect for both.

Therefore, a more appropriate solution is proposed by means of adapting the screen side or the LED-display or LED-wall itself. For example, here at the display side, individual colour intensities can be changed, such that these will be recorded as needed by the camera. Since only the display (primary) colours intensities are changed, this will have no effect on the 'environment' or scene. Therefore, the camera recording will look perfect for scene and display. Since the colour sensitivity of professional and semi-professional cameras is well documented and known, one can add for example a display setting indicating which type of camera is used so that no manual intervention is needed anymore. The method for deriving the cored setting will be based on the knowledge of the primary colours of the displays and inputting the camera sensitivity. This method can be even used for mobile phone cameras.

But still, as a result, the visual perception for the human eye might be heavily disturbed now (since the colour perception of the human eye is different from that of a camera). Therefore, extra colours can be added (e.g. cyan, orange) to the display or e.g. LED-wall, such that the disturbance is eliminated, and the human eye visual perception is corrected and hence satisfactory. Adding extra colours to the display means in fact adding multiple colour spectral elements. The multiple spectral elements will enable display being capable of making use of the colour theory called 'metamerism' whereby it is perfectly possible to show the same perceived colour using completely different spectral settings.

In fact, this 'challenge' is part of a broader aspect of display and light sources for photography and video applications. This display in a studio environment is also acting as a light source whether this is desired or not. As indicated earlier, the light spectrum of typical LED illumination devices, such as typical red-green-blue (RGB) LED devices, is fixed and does not match to the light spectrum of, for example, natural sunlight or of industry-standard white light sources, such as halogen lamps, tungsten lamps, and fluorescent lamps. Therefore, when using LED illumination devices, the resulting reflected light may not match that of natural sunlight or industry-standard light sources. Consequently, the reflected imagery that results from the LED illumination devices may not appear correctly as perceived by the human eye or as captured by a still camera or video camera (e.g. standard film or digital image capture), as compared with the reflected imagery that results from natural sunlight or standard light sources. While it may be possible to apply manual filtering in combination with the LED illumination, manual filtering is not adequate to provide matching for all colours.

For these reasons, alternative approaches are needed for enabling the widespread use of LED illumination in, for example, photography and video applications. Therefore, a need exists for a system for and method of matching the spectrum of a multi-colour LED illumination device to the spectrum of any white light source.

Figure 15A:
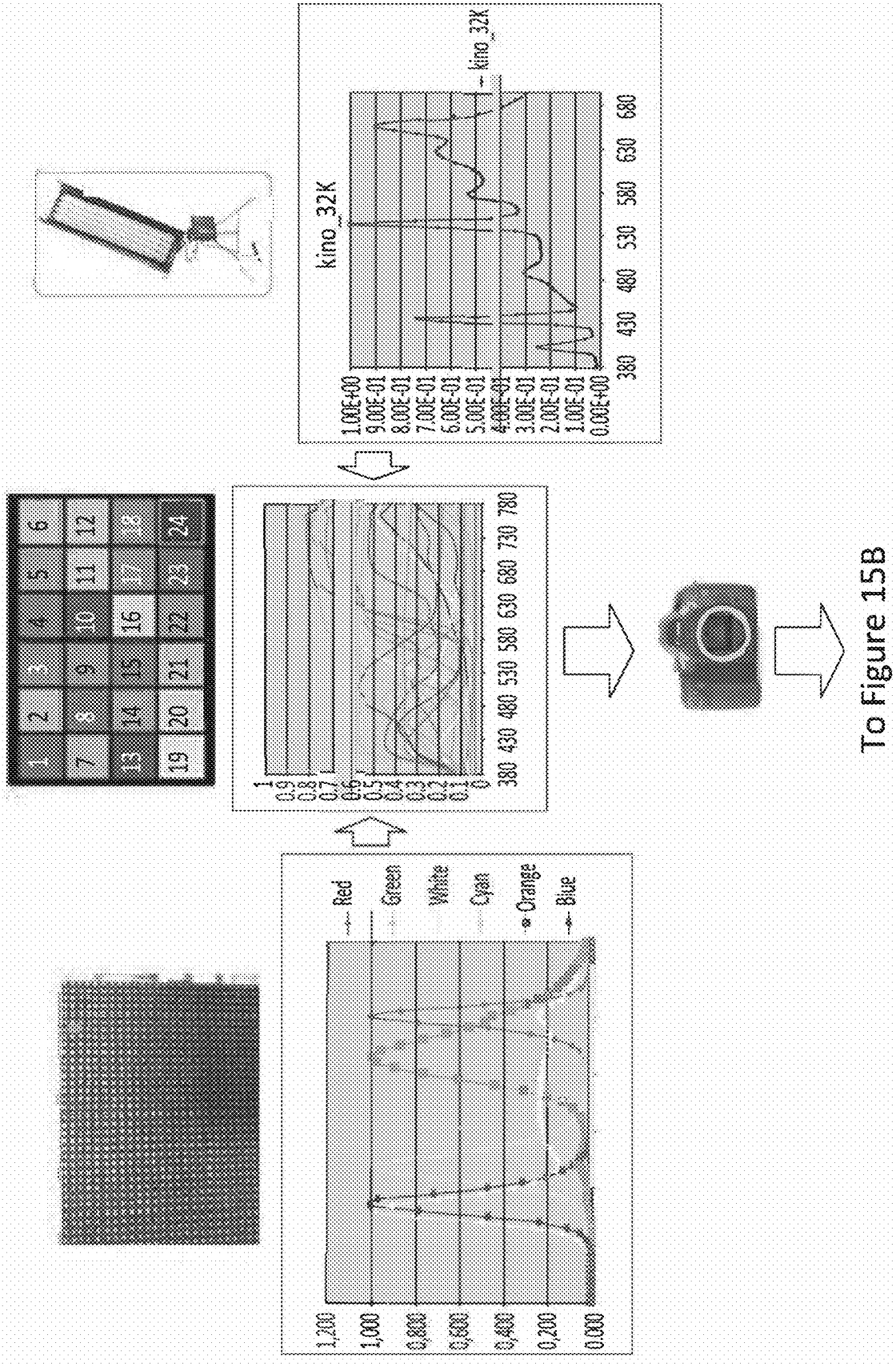
FIGS. 15A and 15B illustrate a schematic overview of a spectral analysis system for matching the spectrum of a multi-spectral display (with multi-colour LEDs) to the spectrum of any white light source whilst also taking into account the camera sensitivities, in accordance with the invention.
Figure 15B:
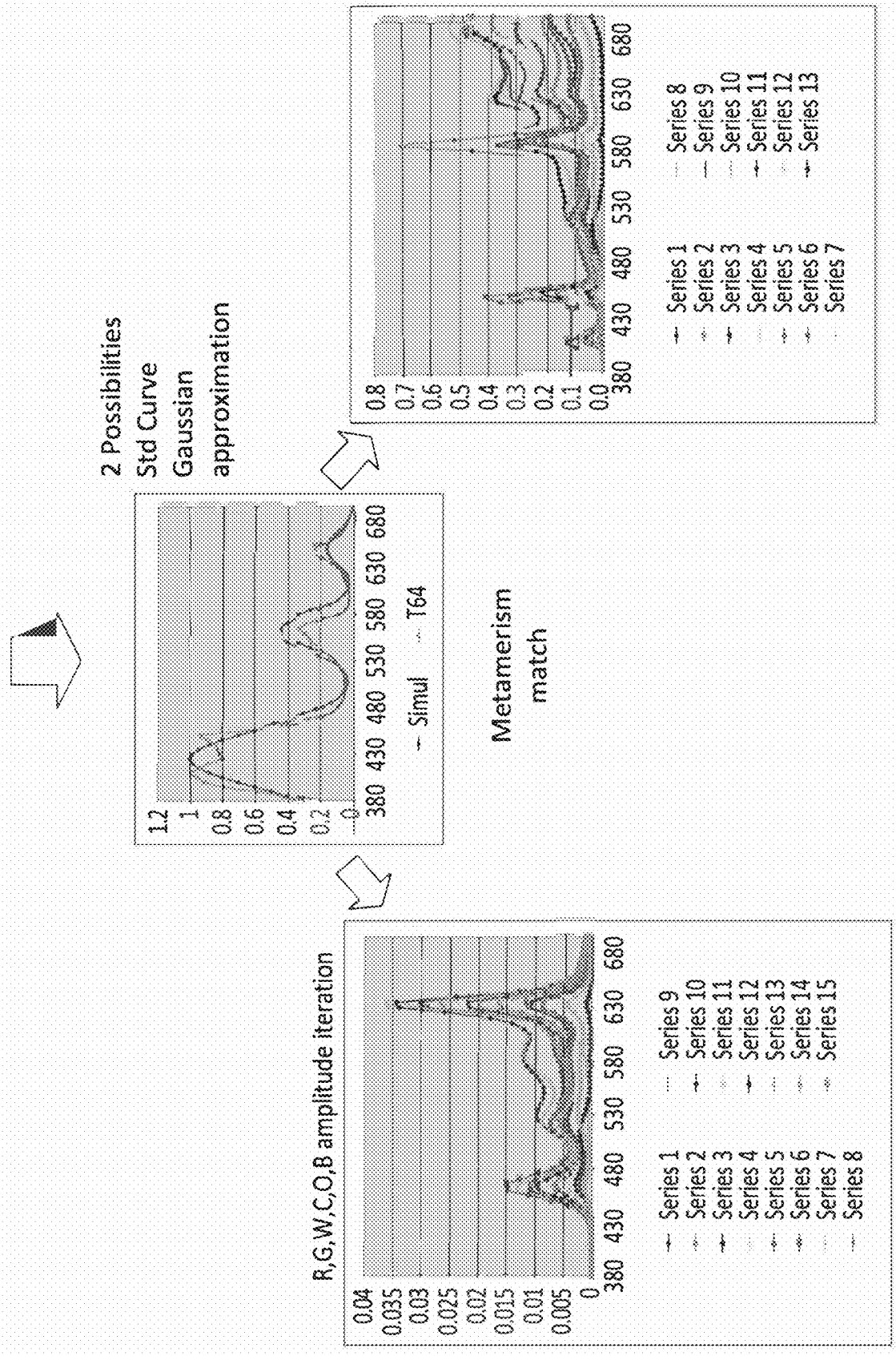
Figure 16:
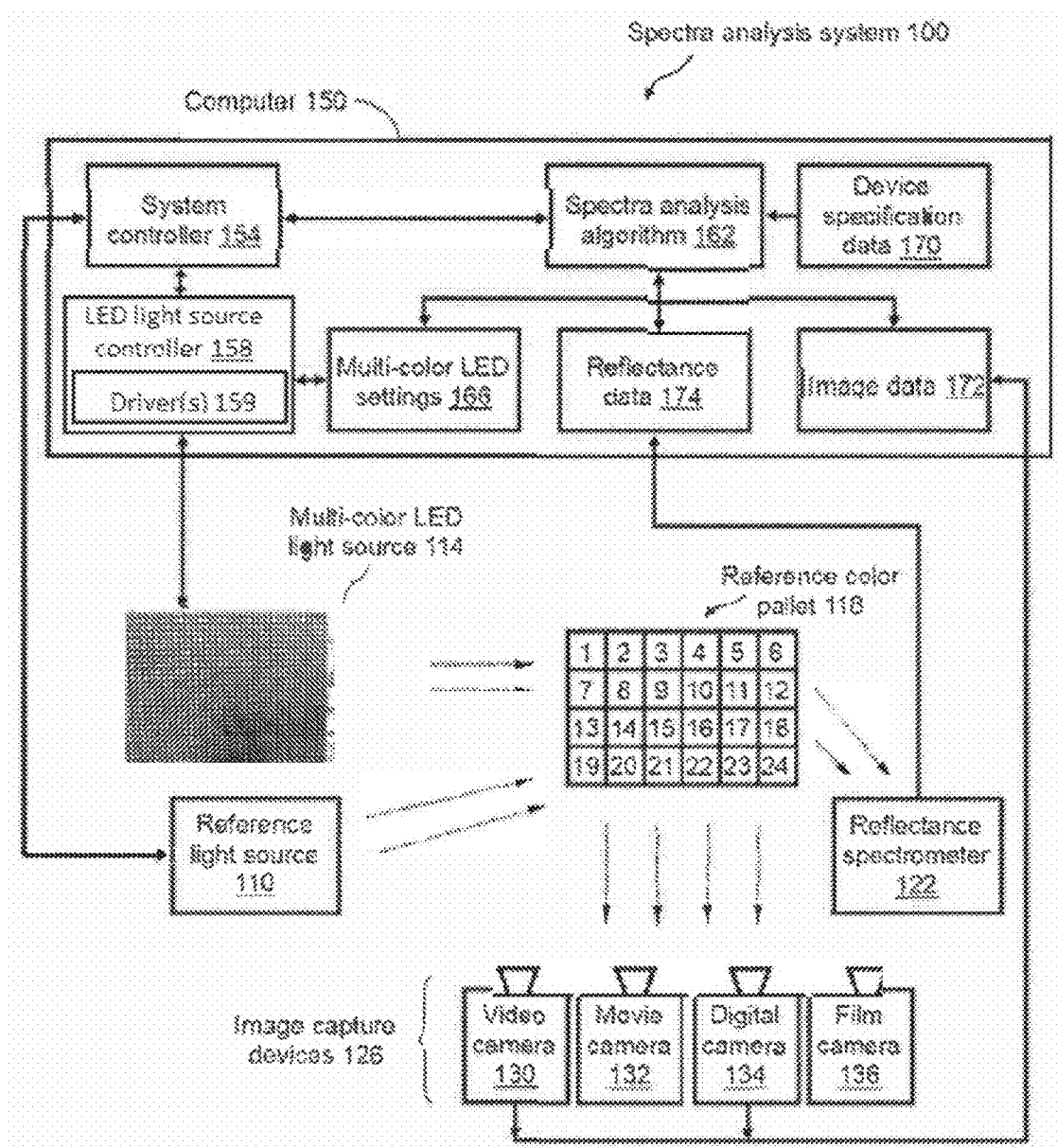
FIG. 16 is the corresponding flow diagram of FIGS. 15A and 15B.

FIGS. 15A and 15B illustrate a schematic overview of a spectral analysis system for matching the spectrum of a multi-spectral display (with multi-colour LEDs) to the spectrum of any white light source whilst also taking into account the camera sensitivities. FIG. 16 is the according flow diagram.

FIG. 16 illustrates a functional block diagram of a spectra analysis system 100 for matching the spectrum of a multi-colour LED illumination device to the spectrum of any white light source, in accordance with the invention. Spectra analysis system 100 includes a reference light source 110 that may be any commercially available white light source, such as, but not limited to, one or more commercially available halogen lamps, tungsten lamps, fluorescent lamps, hydrargyrum medium-arc iodide (HMI) lamps, and any combinations thereof. For example, reference light source 110 may be a Kino Flo 3200 fluorescent lamp from Kino Flo Inc. (Burbank, CA) or a Lowell 3200 tungsten lamp from Lowel-Light Manufacturing, Inc. (Brooklyn, NY); where 3200 refers to a lamp colour temperature (CT) of 3200 Kelvin (K). Additionally, reference light source 110 may be representative of natural sunlight.

Additionally, spectra analysis system 100 includes a multi-colour LED light source 114 that is, for example, an LED white light source that is formed of at least the combination of RGB plus one additional colour, i.e. a 4-colour LED light source. Preferably, multi-colour LED light source 114 is an LED white light source that is formed of the combination of RGB plus three additional colours, i.e. a 6-colour LED light source. In one example, multi-colour LED light source 114 is a 6-colour modular LED lighting device More specifically, the colours that form the 6-colour modular LED lighting device may include, but are not limited to, red, green, white, cyan, orange, and blue.

Spectra analysis system 100 further includes a reference colour pallet 118, which is the reference colour pallet of colours to be illuminated by reference light source 110 and multi-colour LED light source 114. Reference colour pallet 118 may be any user-determined number of colours by which the light spectrum of reference light source 110 and multi-colour LED light source 114 may be analysed. In one example, reference colour pallet 118 may be a Munsell or Macbeth colour chart that may include, for example, about 8 to about 24 colours.

Spectra analysis system 100 further includes a reflectance spectrometer 122. Reflectance spectrophotometers measure the amount of light reflected by a surface as a function of wavelength to produce a reflectance spectrum. For a target sample that is illuminated by white, the operation of a spectrophotometer is to calculate the amount of light that is reflected at each wavelength interval. Referring to FIG. 16, reflectance spectrometer 122 is used to calculate the light that is reflected from reference colour pallet 118 when it is illuminated by reference light source 110 or by multi-colour LED light source 114. Reflectance spectrometer 122 may be any commercially available spectrometer.

Spectra analysis system 100 further includes a set of one or more image capture devices 126. Image capture devices 126 may include, for example, but are not limited to, a video camera 130, a movie camera 132, a digital camera 134, and a film camera 136. Video camera 130 may be any commercially available video camera for recording moving images electronically, such as those used in the television industry. Movie camera 132 may be any commercially available movie camera for recording moving images on film, such as those used in the motion picture industry. Digital camera 134 may be any commercially available digital camera for recording still images digitally, such as those available from Sony Corp. (Tokyo, Japan), Canon Inc. (Tokyo, Japan), and Eastman Kodak Company (Rochester, NY). Film camera 136 may be any commercially available film camera for recording still images on film, such as 35*mm* cameras from Olympus Imaging America Inc. (Melville, NY), Canon Inc. (Tokyo, Japan), and Eastman Kodak Company (Rochester, NY).

Spectra analysis system 100 further includes a computer 150 that may be any commercially available handheld, laptop, desktop, or networked computing device. Residing on computer 150 is a system controller 154 that may be any commercially available controller, microcontroller, or digital signal processor (DSP) device that is capable of executing program instructions, such as those of an LED light source controller 158 and a spectra analysis algorithm 162. Furthermore, system controller 154 manages the overall operations of spectra analysis system 100, including managing the communications and data transfer between hardware and software components thereof.

LED light source controller 158 may be a software or hardware controller that is associated with multi-colour LED light source 114, and LED light source controller comprises one or more display drivers 159, for example, pulse-width modulation (PWM) drivers. LED light source controller 158 provides the interface between spectra analysis algorithm 162 and multi-colour LED light source 114. In particular, LED light source controller 158 reads in a set of associated multi-colour LED settings 166, which are operating parameters that are then passed on to multi-colour LED light source 114, thereby setting the light output thereof. Example operating parameters for multi-colour LED light source 114 may include, but are not limited, to colour temperature, overall device power level, individual intensity level of each of the multiple colours.

Spectra analysis algorithm 162 may be a software algorithm that executes program instructions that are required for matching the spectrum of a multi-colour LED illumination device, such as multi-colour LED light source 114, to the spectrum of any white light source, such as reference light source 110. A source of input data to spectra analysis algorithm 162 may be, but is not limited to, device specification data 170, image data 172, and reflectance data 174. In one example, device specification data 170 may include certain specification information, such as the optical filter specifications and response curve information, of each image capture device 126 of interest (e.g. video camera 130, movie camera 132, digital camera 134, and film camera 136) and of the human eye. This information may be supplied by the manufacturer of each image capture device 126. In another example, device specification data 170 may include certain specification information for reference light source 110, such as the spectra information that may be supplied by the manufacturer of a certain light source device. If not supplied by the manufacturer, the spectra information of reference light source 110 may be measured via reflectance spectrometer 122 and stored in device specification data 170. In the case of image capture devices 126 that are digital, image data 172 may be the digital image data that is returned therefrom. Reflectance data 174 may be the data that is returned from reflectance spectrometer 122 that includes the amount of light that is reflected from reference colour pallet 118 at each wavelength interval.

The operations that are performed by control of spectra analysis algorithm 162 may include, but are not limited to, the following:

activating/deactivating the reference light source, either automatically via system controller 154 or, alternatively, by prompting a user via a user interface (not shown) to manually activate/deactivate the reference light source;

activating/deactivating the multi-colour LED light source, either automatically via system controller 154 and LED light source controller 158 or, alternatively, by prompting a user to manually activate/deactivate the multi-colour LED light source;

activating/deactivating the reflectance spectrometer, either automatically via system controller 154 or, alternatively, by prompting a user to manually activate/deactivate the reflectance spectrometer;

storing the data that is returned from the reflectance spectrometer;

calculating and storing the difference between the reflectance of the reference light source and the reflectance of the multi-colour LED light source;

determining and storing the optimal output settings of the multi-colour LED light source for matching the spectrum of the reference light source;

applying any optical filter characteristics of interest to the optimal output settings of the multi-colour LED light source;

using the optimal output settings of the multi-colour LED light source, initiating an image capture event via one or more image capture devices, either automatically via system controller 154 or, alternatively, by prompting a user to manually perform the image capture operation; and reading in the image data from the one or more image capture devices and verifying that the spectrum of the multi-colour LED illumination device substantially matches the spectrum of the reference light source.

10. Since traditional (surface mount) LEDs have a particular RGB die arrangement within a package, the colours emitted in all directions will be slightly different. Hence, one can turn these LEDs 90°/180° degrees in alternating ways to overcome these viewing angle issues, but can also have the acoustic shader take care of it. A diffuser lens may be mounted on top of the LEDs, or light emitting elements in general of the display used, not only for uniformity aspects, but providing simultaneously a structure for dampening acoustically (or sound absorption and/or diffusing). With such optical diffuser lens, a rather closed design is proposed, although a more open design would also be an improvement, e.g. particularly acoustically wherein the open grid added material comprises only sound absorbing and/or diffusing characteristics, and is provided as a matrix in between the LEDs of the display. In an embodiment, the optical diffuser (e.g. lens) for enhancing/changing the display's optical characteristic, may as well act as acoustic diffuser.

11. Dynamic Range

Figure 17:
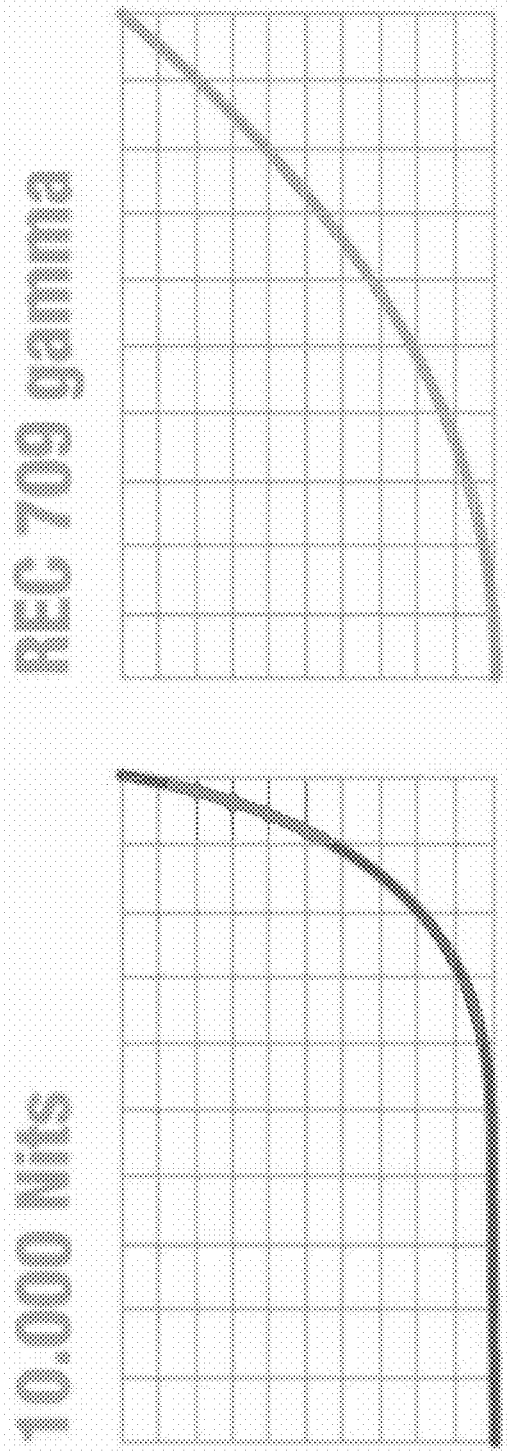
FIG. 17 shows the PQ gamma curve as defined in BT2100.

Since LED screens have the potential to have a very high dynamic range (i.e. Brightness of 5000 nits and more), there is a need to show the full dynamic range defined by e.g. PQ gamma curve as defined in BT2100.

https://www.eizoglobal.com/library/management/ins-and-outs-of-hdr/index2.html also available in FIG. 17 of the drawings set.

The range is between 0 and 10.000 nit as this gamma definition is based upon absolute brightness.

The range to show all the incoming values distinctly requires at least 24 bits when using PWM. Most common LED constant current PWM drivers however are limited to 14 bit (and in some exceptional cases to 16 bit).

So, in order to show this full dynamic range without grey scale loss, this is not possible. However, what is proposed are several solutions to this issue for achieving a wider than standard dynamic range:

dependent on desired clustered content, adjust also the current of the PWM driver.

Increasing the current will also increase the LEDs light output. This is in most cases not linear, but since we can characterize this behaviour, this can be compensated for using a formula, dependent on required brightness. In the ideal case there is a current setting for each individual LED, but not al PWM LED drivers in the field have this function. Generally, one particular PWM driver current setting is common for a group of LEDs, and thus all LEDs (e.g. 8 or 16) hooked up to the PWM driver in particular will be affected. In case that each LED has a current setting, then the cluster is of course one LED. An algorithm could e.g. be: determine max nit level for LEDs in particular cluster dependent on content, and set current for this particular LED or LEDs to max LED current. Dependent on this current, determine other values of LEDs and use PWM to set to desired brightness using spline curve adaptation.

in combination with or independent form the above, there is also an alternative way to generate a gamma like behaviour. In all existing system today, people are working with a fixed frequency clock to generate a PWM cycle. E.g. in case of 12 bit, to achieve 50% of brightness, one sets PWM high for 2048 counts out of the 4096. This is schematically shown in FIG. 18 (a). Alternatively, as illustrated in FIG. 18 (b), one can modulate the clock, i.e. higher frequency at the start of the PWM cycle to a lower frequency at end of PWM cycle. This in fact means that the 'lowest' bit on time is shorter (and this is exactly what is needed in a gamma curve). So, stand alone or a combination of a gamma look up table and modulation of the grey scale clock in frequency during PWM cycle can mathematically give you more than 24 bit of 'grey' scales if one sees it in a linear frequency time domain. And this is exactly what we want, and considered very important while not at all known from the art.

However, in some circumstances, showing the full dynamic range is not really desired (e.g. when the screen is used to see or evaluate how the picture or movie looks like on a traditional display (e.g. monitor or projector) that cannot achieve the full dynamic range of the 10.000 nit). One can use e.g. the spline curve adaptation to set the maximal brightness to the monitor brightness (and/or also change the global current to the LEDs for the desired colour and brightness) and then show the content in the REAL—fixed brightness (and even the same colour points=>see calibration as for example described in patent application BE2019/5196 regarding a deformable display) as if it was shown on that monitor and or projector.

The invention claimed is:

1. A system for driving light-emitting elements (LEEs) or pixels of a light-emitting display, the system comprising:
   an input for receiving a light source input signal and
   a pulse-width modulation (PWM) driver configured to transfer said input into signals to be delivered to pixel drivers, thereby defining and controlling an output emitted by the light-emitting elements (LEEs) or pixels; and
   one or more processors and/or circuits configured to improve interplay of the display with a camera recording an image that is displayed by the display, based on the light source input signal received by the display, receiving one or more values representing a programmable delay relative to the operation of the camera having a shutter and corresponding shutter time, and applying the light source input signal to the display, based on the one or more programmable delay values.

2. The system according to claim 1, wherein said programmable off-set is selected to improve said interplay of the display with said camera by reducing banding effects on said camera.

3. The system according to claim 1, further comprising a clock for start and stop of the PWM driver.

4. The system according to claim 1, wherein the system is configured to perform calibration to be used in defining the output to be emitted by the light-emitting elements or pixels.

5. The system according to claim 1, further comprising a memory to store instructions that when executed, implement said clock for said start and stop of the PWM driver.

6. The system according to claim 1, further comprising a processor configured to receive said input, generate and transfer said input into signals to be delivered to the pixel drivers, and perform said defining and controlling the light-emitting elements or pixels, and said applying the light source input signal to the display, based on instructions stored in a memory storage of the system.

7. The system according to claim 1, wherein said one or more processors are components of a processor of the system, which implements said improvement of the interplay of the display with the camera recording the image based on instructions stored in a memory storage of the system.

8. The system according to claim 1, wherein said input is a hardware input device.

9. The system according to claim 1, wherein the one or more processors and/or circuits are configured to perform sync-banding, by applying reduced banding effect, which is output to the PWM driver.

10. A studio system comprising the system according to claim 1, further comprising said display that is configured to be driven by the system, and the camera recording the image that is displayed by the display.

11. A method for driving light-emitting elements or pixels of a light-emitting display thereof, the system comprising an input for receiving input and a pulse-width modulation (PWM) driver configured to transfer said input into signals to be delivered to pixel drivers, and wherein the system comprises one or more processors and/or circuits configured to improve interplay of the display with a camera recording an image that is displayed by the display, the method comprising:
   defining and controlling the light-emitting elements or pixels in the output to be emitted by them, based on a light source input signal received by the display, receiving one or more values representing a programmable off-set relative to the operation of the camera having a shutter and corresponding shutter time; and
   applying the light source input signal to the display, based on the one or more programmable off-set values.

12. The method according to claim 11, wherein said programmable off-set is selected to improve said interplay of the display with said camera by reducing banding effects on said camera.

13. The method according to claim 11, wherein a clock for start and stop of the PWM driver is included.

14. The method according to claim 11, further comprising the one or more processors and/or circuits performing calibration and herewith determining calibration matrices to be used in defining the output to be emitted by the light-emitting elements or pixels.

15. The method according to claim 11, wherein a memory stores instructions that when executed, implement said start and stop clock.

16. The method according to claim 11, wherein a processor receives said input, generates and transfers said input into signals to be delivered to the pixel drivers, and performs said defining and controlling the light-emitting elements or pixels, and said applying the light source input signal to the display, based on instructions stored in a memory storage of the system.

17. The method according to claim 11, wherein said one or more processors are components of a processor of the system, which implements said improvement of the interplay of the display with the camera recording the image based on instructions stored in a memory storage of the system.

18. The method according to claim 11, wherein said input is a hardware input device.

19. The method according to claim 11, wherein the one or more processors and/or circuits are configured to perform sync-banding, by applying reduced banding effect, which is output to the PWM driver.

20. One or more non-transitory computer-readable mediums have instructions stored thereon, which, when executed by one or more processors of a system for driving light-emitting elements or pixels, causes the one or more processors to perform the method according to claim 11.

* * * * *